United States Patent
Saillard et al.

(10) Patent No.: US 12,488,899 B2
(45) Date of Patent: Dec. 2, 2025

(54) SYSTEMS AND METHODS FOR DETERMINING BREAST CANCER PROGNOSIS AND ASSOCIATED FEATURES

(71) Applicants: OWKIN, INC., New York, NY (US); OWKIN FRANCE SAS, Paris (FR)

(72) Inventors: Charlie Saillard, Paris (FR); Benoit Schmauch, Paris (FR); Victor Aubert, Paris (FR); Aurelie Kamoun, Paris (FR); Magali Lacroix-Triki, Paris (FR); Ingrid Garberis, Paris (FR); Damien Drubay, Paris (FR); Fabrice André, Paris (FR)

(73) Assignees: OWKIN FRANCE SAS, Paris (FR); OWKIN, INC., New York, NY (US)

( * ) Notice: Subject to any disclaimer, the term of this patent is extended or adjusted under 35 U.S.C. 154(b) by 0 days.

(21) Appl. No.: 18/127,566

(22) Filed: Mar. 28, 2023

(65) Prior Publication Data
US 2023/0282362 A1    Sep. 7, 2023

Related U.S. Application Data

(63) Continuation of application No. 18/186,111, filed as application No. PCT/US2022/043692 on Sep. 15, 2022.

(51) Int. Cl.
| | | |
|---|---|---|
| G16H 50/30 | (2018.01) | |
| G06N 3/0464 | (2023.01) | |
| G06N 3/0895 | (2023.01) | |
| G06V 10/82 | (2022.01) | |
| G16H 10/40 | (2018.01) | |
| G16H 30/40 | (2018.01) | |
| G16H 50/20 | (2018.01) | |
| G16H 50/70 | (2018.01) | |

(52) U.S. Cl.
CPC ............ *G16H 50/30* (2018.01); *G06N 3/0464* (2023.01); *G06N 3/0895* (2023.01); *G06V 10/82* (2022.01); *G16H 10/40* (2018.01); *G16H 30/40* (2018.01); *G16H 50/20* (2018.01); *G16H 50/70* (2018.01)

(58) Field of Classification Search
CPC ........ G16H 50/30; G16H 10/40; G16H 50/20; G16H 30/40; G06V 10/82; G06N 3/0895; G06N 3/0464

See application file for complete search history.

(56) References Cited

U.S. PATENT DOCUMENTS

2021/0209753 A1* 7/2021 Dogdas ............... G06V 20/698
2021/0366107 A1   11/2021 Van Leeuwen et al.

FOREIGN PATENT DOCUMENTS

WO        2021062366 A1    4/2021

OTHER PUBLICATIONS

PCT International Search Report And The Written Opinion Of The International Searching Authority, Or The Declaration, for PCT/US2022/043692 mailed Feb. 14, 2023, 15 pages.
Richard J. Chen et al., "Pathomic Fusion: An Integrated Framework for Fusing Histopathology and Genomic Features for Cancer Diagnosis and Prognosis", Arxiv. Org, Cornell University Library, 201 Olin Library Cornell University Ithaca, NY 14853, Sep. 3, 2020, XP081753833.
Olivier Dehaene et al.: "Self-Supervision Closes the Gap Between Weak and Strong Supervision in Histology", Arxiv. Org, Cornell University Library, 201 Olin Library Cornell University Ithaca, NY 14853, Dec. 7, 2020, XP081831666.

* cited by examiner

*Primary Examiner* — Jerry Lin
(74) *Attorney, Agent, or Firm* — MARSHALL, GERSTEIN & BORUN LLP

(57) ABSTRACT

A computer implemented method and a machine learning model for predicting the likelihood that a subject having breast cancer will experience a relapse following treatment, predicting a tumor within a whole slide image, and/or predicting a status of a biomarker in breast cancer tissue is provided.

29 Claims, 27 Drawing Sheets
(16 of 27 Drawing Sheet(s) Filed in Color)

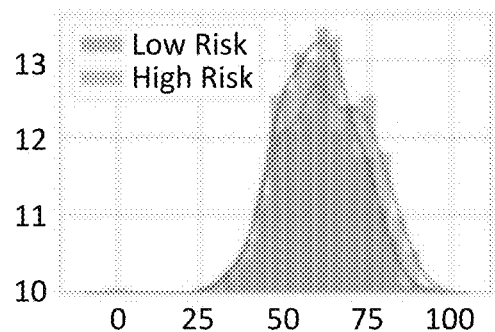
FIG. 9B Age
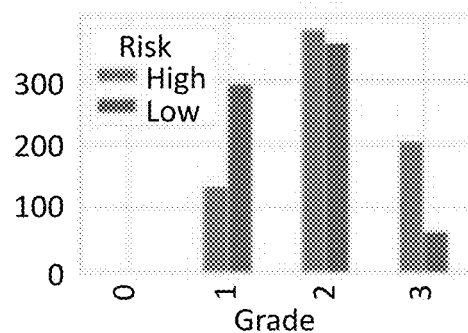
FIG. 9C Grade
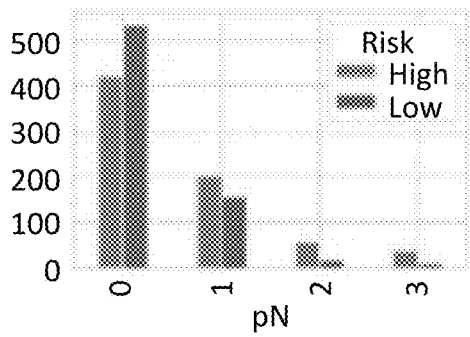
FIG. 9D pN
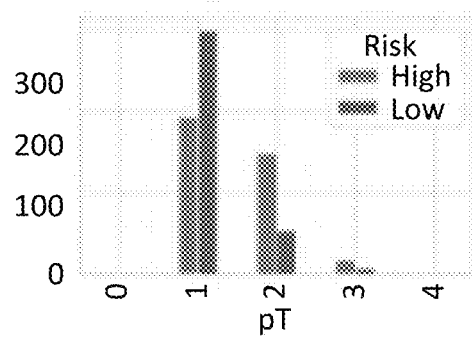
FIG. 9E pT
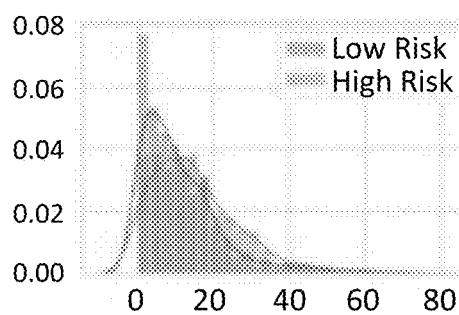
FIG. 9F Ki67

SYSTEMS AND METHODS FOR DETERMINING BREAST CANCER PROGNOSIS AND ASSOCIATED FEATURES

CROSS-REFERENCE

This application is a continuation of co-pending U.S. application Ser. No. 18/186,111, filed Mar. 17, 2023, which claims the benefit of U.S. National Phase Application under 35 U.S.C. 371 of International Application No. PCT/US2022/043692 filed Sep. 15, 2022, which claims the benefit of European Patent Application No. EP21306284.7 filed Sep. 16, 2021, which are incorporated herein by reference in their entireties.

FIELD OF INVENTION

This invention relates generally to machine learning and computer vision and more particularly to image preprocessing and classification.

BACKGROUND OF THE INVENTION

Histopathological image analysis (HIA) is a critical element of diagnosis in many areas of medicine, and especially in oncology. Breast cancer has a favorable long-term prognosis, with an estimated average 5-year survival rate of 87%. Nevertheless, about 10% of patients relapse after initial treatment with local recurrence or distant metastasis. Early detection and management of the relapse will offer therapeutic advantages and may improve prognosis and quality of life in these patients. A need, therefore, exists for diagnostic tools to better evaluate risk of relapse and associated features in breast cancer patients.

SUMMARY OF THE DESCRIPTION

A method and apparatus of a device that classifies an image is described.

In one aspect, disclosed herein is a computer-implemented method for predicting the likelihood that a subject having breast cancer will experience a relapse following treatment. In an exemplary embodiment, the method obtains a digital image of a histologic section of a breast cancer sample derived from the subject and one or more subject attributes derived from the subject. The method further computes an artificial intelligence (AI) risk score using a machine learning model, the machine learning model having been trained by processing a plurality of training images to predict a risk of relapse. In addition, the method computes a clinical risk score using a clinical model and the one or more subject attributes, the clinical model trained using one or more subject training attributes from different subjects. Furthermore, the method computes a final risk score for the subject from the AI risk score and the clinical risk score, wherein the final risk score represents the likelihood that the subject will experience a relapse following treatment.

In a further aspect, disclosed herein machine readable medium having executable instructions to cause one or more processing units to perform a method of predicting the likelihood that a subject having breast cancer will experience a relapse following treatment. In an exemplary embodiment, the machine readable medium method obtains a digital image of a histologic section of a breast cancer sample derived from the subject and one or more subject attributes derived from the subject. The machine readable medium method further computes an AI risk score using a machine learning model, the machine learning model having been trained by processing a plurality of training images to predict a risk of relapse. In addition, the machine readable medium method computes a clinical risk score using a clinical model and the one or more subject attributes, the clinical model trained using one or more subject training attributes from different subjects. Furthermore, the machine readable medium method computes a final risk score for the subject from the AI risk score and the clinical risk score, wherein the final risk score represents the likelihood that the subject will experience a relapse following treatment.

BRIEF DESCRIPTION OF THE DRAWINGS

The patent or application file contains at least one drawing in color. Copies of the patent or patent application publication with color drawing(s) will be provided by the Office upon request and payment of the necessary fee.

The present invention is illustrated by way of example and not limitation in the figures of the accompanying drawings in which like references indicate similar elements.

FIG. 6A depicts cross-validation results using DeepMIL with MoCo features for the DL model in the entire study cohort (n=1800, "all", left), subjects who had no lymph node metastasis at the time of diagnosis ("n0", middle), and subjects who had lymph node metastasis at the time of diagnosis ("n+", right). FIG. 6B depicts cross-validation results using DeepMIL with ImageNet features for the DL model in the entire study cohort. FIG. 6C depicts cross-validation results using DeepMIL with MoCo features for the DL model in the population of ER+/HER2−(also referred to as "HR+/HER2−" in the present disclosure) subjects (n=1437) ("all", left), subjects who had no lymph node metastasis at the time of diagnosis ("n0", middle), and subjects who had lymph node metastasis at the time of diagnosis ("n+", right). FIG. 6D depicts cross-validation results using DeepMIL with ImageNet features for the DL model in the ER+/HER2− subjects.

FIGS. 9A-9F are graphs showing stratification of subjects of the study cohort into groups with low risk of relapse and high risk of relapse based on the AI risk score generated using the trained DeepMIL using MoCo features according to an embodiment of the present disclosure. The following clinical features of the high risk and low risk groups are depicted: MFI (FIG. 9A), age (FIG. 9B), tumor grade (FIG. 9C), pN (FIG. 9D), pT (FIG. 9E), and Ki67 (FIG. 9F).

DETAILED DESCRIPTION

Figure 1:
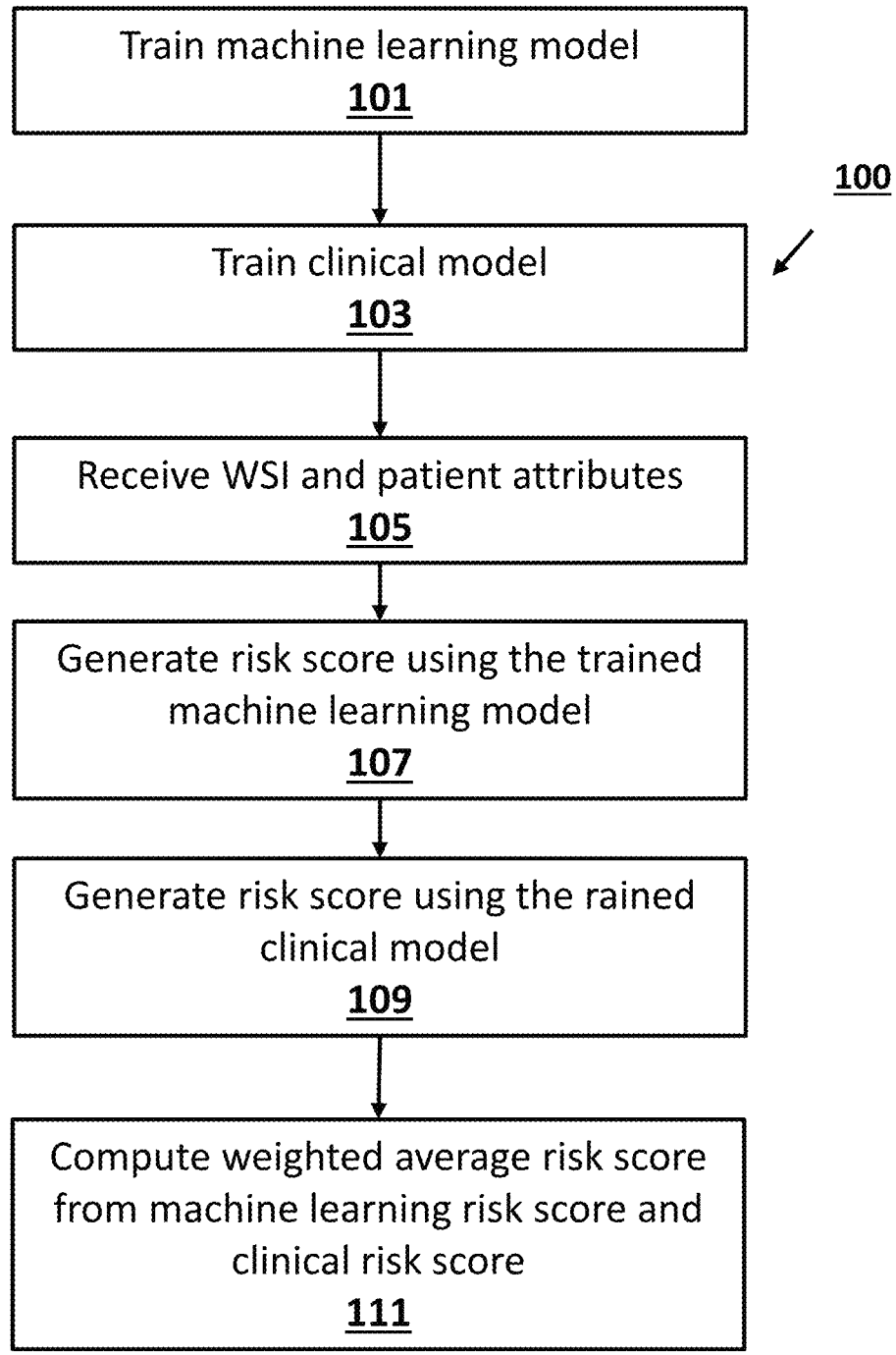
FIG. 1 illustrates an example flow diagram for a process of determining breast cancer prognosis using machine learning and clinical models, according to embodiments of the present disclosure.

Computer-implemented methods, associated systems, apparatus, and computer-readable media for determining breast cancer diagnosis and/or prognosis is described. In some aspects, provided herein is a diagnostic tool that applies deep learning (DL) to digital images of histology sections, e.g., whole slide images (WSI) and/or clinical data in order to aid in therapeutic decisions, to identify subjects who has an increased likelihood of relapse after initial treatment for breast cancer, and/or to determine biomarker status in breast cancer tissue of subjects.

In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "some embodiments" means that a particular feature, structure, or characteristic described in connection with the embodiment can be included in at least one embodiment of the invention. The appearances of the phrase "in one embodiment" in various places in the specification do not necessarily all refer to the same embodiment. The term "exemplary" is used herein in the sense of "example," rather than "ideal." From this disclosure, it should be understood that the invention is not limited to the examples described herein.

For any methods described herein, the ordering of steps as presented, whether in the text or in an accompanying flow diagram, should not be taken to mean that those steps must be performed in the order presented, unless otherwise specified or required by context. Rather, the order of steps presents one embodiment of the methods provided, and in general such steps may alternatively be performed in a different order or simultaneously. The processes depicted in the figures that follow may be performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

Computing methods used for implementing the methods provided herein can include, for example, machine learning, artificial intelligence (AI), deep learning (DL), neural networks, classification and/or clustering algorithms, and regression algorithms.

The terms "server," "client," and "device" are intended to refer generally to data processing systems rather than specifically to a particular form factor for the server, client, and/or device.

The articles "a" and "an" are used herein to refer to one or to more than one (i.e., to at least one) of the grammatical object of the article. By way of example, "an element" means one element or more than one element, e.g., a plurality of elements.

The term "including" is used herein to mean, and is used interchangeably with, the phrase "including but not limited to." The term "including" does not necessarily imply that additional elements beyond those recited must be present.

The term "about" or "approximately" when referring to a number or a numerical range means that the number or numerical range referred to is an approximation within experimental variability (or within statistical experimental error), and, thus, the number or numerical range may vary from, for example, between 1% and 20% of the stated number or numerical range. In some aspects, "about" indicates a value within 20% of the stated value. In more preferred aspects, "about" indicates a value within 10% of the stated value. In even more preferred aspects, "about" indicates a value within 1% of the stated value.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in aspects of the present invention. Notwithstanding that the numerical ranges and parameters setting forth the broad scope of the invention are approximations, the numerical values set forth in the specific examples are reported as precisely as possible. Any numerical values; however, inherently contain certain errors necessarily resulting from error found in their respective measurements.

The term "at least" prior to a number or series of numbers is understood to include the number adjacent to the term "at least", and all subsequent numbers or integers that could logically be included, as clear from context. When "at least" is present before a series of numbers or a range, it is understood that "at least" can modify each of the numbers in the series or range.

As used herein, "no more than" or "less than" is understood as the value adjacent to the phrase and logical lower values or integers, as logical from context, to zero (if negative values are not possible). When "no more than" is present before a series of numbers or a range, it is understood that "no more than" can modify each of the numbers in the series or range.

As used herein, "up to" as in "up to 10" is understood as up to and including 10, i.e., 0, 1, 2, 3, 4, 5, 6, 7, 8, 9, or 10, in the context of non-negative integers.

Where a range of values is provided, it is understood that each intervening value (e.g., to the tenth of the unit of the lower limit unless the context clearly dictates otherwise) between the upper and lower limit of that range and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

A "patient" refers to a subject who shows symptoms and/or complications of a disease or condition (e.g., breast cancer), is under the treatment of a clinician (e.g., an oncologist), has been diagnosed as having a disease or condition, and/or is at a risk of developing a disease or condition. The term "patient" includes human and veterinary subjects. Any reference to subjects in the present disclosure should be understood to include the possibility that the subject is a "patient" unless clearly dictated otherwise by context.

As used herein, "predict" or "predicting" in the context of this disclosure refers to determining a likelihood of occurrence or nonoccurrence of a disease, a condition, or an event (e.g., relapse of breast cancer) in the past, present, or future. In some embodiments, a model (e.g., DeepMIL with MoCo features, DeepMIL with ImageNet features) can predict a likelihood of breast cancer relapse, a tumor region, or a status of a biomarker (e.g., PR, ER, HER2, Ki67) by one or more of the following measures of test accuracy:

an odds ratio greater than 1, preferably about 2 or more or about 0.5 or less, about 3 or more or about 0.33 or less, about 4 or more or about 0.25 or less, about 5 or more or about 0.2 or less, or about 10 or more or about 0.1 or less;

a specificity of greater than 0.5, preferably at least about 0.6, at least about 0.7, at least about 0.8, at least about 0.9, or at least about 0.95, with a corresponding sensitivity greater than 0.2, preferably at least about 0.3, at least about 0.4, at least about 0.5, at least about 0.6, at least about 0.7, at least about 0.8, at least about 0.9, or at least about 0.95;

a sensitivity of at least 0.5, preferably at least about 0.6, at least about 0.7, at least about 0.8, at least about 0.9, or at least about 0.95, with a corresponding sensitivity at least 0.2, preferably at least about 0.3, at least about 0.4, at least about 0.5, at least about 0.6, at least about 0.7, at least about 0.8, at least about 0.9, or at least about 0.95;

at least about 75% sensitivity, combined with at least about 75% specificity;

a positive likelihood ratio [calculated as sensitivity/(1-specificity)] of greater than 1, preferably at least about 2, at least about 3, at least about 4, at least about 5, at least about 10; or a negative likelihood ratio [calculated as (1-sensitivity)/specificity] of less than 1, preferably about 0.5 or less, about 0.33 or less, about 0.25 or less, or about 0.1 or less.

As used herein, "risk score" refers to a likelihood of a certain event, e.g., a disease, relapse, is going to happen in the future. In some embodiments, the risk score represents the likelihood that the patient will experience a relapse following treatment. In some embodiments, the risk score is expressed as a classification. In other embodiments, the risk score is expressed as a continuous range. In one embodiment, the risk score represents the likelihood that the patient will experience relapse within five years of the date that the breast cancer sample was derived from the patient.

As used herein, a "subject" is an animal, such as a mammal, including a primate (such as a human, a monkey, and a chimpanzee) or a non-primate (such as a cow, a pig, and a horse) that benefits from the methods according to the present disclosure. In some aspects of the invention, the subject is a human, such as a human diagnosed with breast cancer. The subject may be a female human. The subject may be a male human. In some aspects, the subject is an adult subject.

As used herein, a "tumor" refers to an abnormal growth of cells or a tissue and/or a mass resulting therefrom. In some embodiments, a tumor tissue or tumor cells are malignant (e.g., cancerous). "Cancer" as used herein refers to a tumor of an epithelial origin in which abnormal cells divide without control and with an ability to invade or metastasize to neighboring or distant tissues or organs.

I. Method of Predicting Likelihood of Breast Cancer Relapse

In some aspects, provided herein is a computer-implemented method of predicting the likelihood that a patient having breast cancer will experience a relapse following treatment.

Histology is the field of study relating to the microscopic features of biological specimens. Histopathology refers to the microscopic examination of specimens, e.g., tissues, obtained or otherwise derived from a subject, e.g., a patient, in order to assess a disease state.

Histopathology specimens generally result from processing the specimen, e.g., tissue, in a manner that affixes the specimen, or a portion thereof, to a microscope slide. For example, thin sections of a tissue specimen may be obtained using a microtome or other suitable device, and the thin sections can be affixed to a slide. To assist in the visualization of the specimen, the specimen may optionally be further processed, for example, by applying a stain. Many stains for visualizing cells and tissues have been developed. These include, without limitation, Haemotoxylin and Eosin (H&E), methylene blue, Masson's trichome, Congo red, Oil Red O, and safranin. H&E is routinely used by pathologists to aid in visualizing cells within a tissue specimen. Hematoxylin stains the nuclei of cells blue, and eosin stains the cytoplasm and extracellular matrix pink. A pathologist visually inspecting an H&E stained slide can use this information to assess the morphological features of the tissue. However, H&E stained slides generally contain insufficient information to assess the presence or absence of particular biomarkers by visual inspection. Visualization of specific biomarkers (e.g., protein or RNA biomarkers) can be achieved with additional staining techniques which depend on the use of labeled detection reagents that specifically bind to a marker of interest, e.g., immunofluorescence, immunohistochemistry, in situ hybridization, etc. Such techniques are useful for determining the expression of individual genes or proteins, but are not practical for assessing complex expression patters involving a large number of biomarkers. Global expression profiling can be achieved by way of genomic and proteomic methods using separate samples derived from the same tissue source as the specimen used for histopathological analysis. Notwithstanding, such methods are costly and time consuming, requiring the use of specialized equipment and reagents, and do not provide any information correlating biomarker expression to particular regions within the tissue specimen, e.g., particular regions within the H&E stained image.

A used herein, the term "digital image" refers to an electronic image represented by a collection of pixels which can be viewed, processed and/or analyzed by a computer. In some aspects of the present disclosure, digital images of histology slides, e.g., H&E stained slides, allow computational assessment of tissue specimens, in addition to or alternatively to visual inspection by a pathologist. In some embodiments, a digital image can be acquired by means of a digital camera or other optical device capable of capturing digital images from a slide, or portion thereof. In other embodiments, a digital image can be acquired by means of scanning a non-electronic image of a slide, or portion thereof. In some embodiments, the digital image used in the applications provided herein is a whole slide image. As used herein, the term "whole slide image (WSI)," refers to an image that includes all or nearly all portions of a tissue section, e.g., a tissue section present on a histology slide. In some embodiments, a WSI includes an image of an entire slide. In other embodiments, the digital image used in the applications provided herein is a selected portion of a tissue section, e.g., a tissue section present on a histology slide. In some embodiments, a digital image is acquired after a tissue section has been treated with a stain, e.g., H&E.

In some aspects, provided herein are computer-implemented methods of predicting the likelihood that a patient having breast cancer will experience a relapse following treatment, said methods comprising:
obtaining a digital image of a histologic section of a breast cancer sample derived from the patient;
obtaining clinical attributes derived from the subject;
dividing the digital image into a set of tiles;
extracting a plurality of feature vectors from the set of tiles, or a subset thereof;
computing an AI risk score using a machine learning model, the machine learning model having been trained by processing a plurality of training images to predict a risk of relapse;
computing a clinical risk score using a clinical model, the clinical model trained using one or more subject attribute; and
computing a final risk score for the subject from the AI risk score and the clinical a risk score, wherein the final risk score represents the likelihood that the patient will experience a relapse following treatment.

In some embodiments, the digital image of the methods is a whole slide image (WSI).

In some embodiments, the histologic section of the breast cancer sample has been stained with a dye., e.g., H&E.

In some embodiments, the breast cancer sample is derived from the patient prior to treatment for said breast cancer.

In some embodiments, the machine learning model is a Deep Multiple Instance Learning (DeepMIL) model. In some embodiments, the machine learning model is a Weldon model. In some embodiments, the machine learning model is a Multi-Layer Perception model.

In some embodiments, the machine learning algorithm is a self-supervised learning algorithm. In some embodiments, the self-supervised learning algorithm is Momentum Contrast (MoCo) or Momentum Contrast v2. In some embodiments, the self-supervised learning algorithm is a DeeMIL model. In some embodiments, a DeepMIL model is trained on histology images using MoCo or MoCo v2. In some embodiments, a DeepMIL model is trained on histology images using ImageNet.

In some embodiments, machine learning algorithm, e.g., DeepMIL MoCo v2 or DeepMIL ImageNet, extracts a plurality of feature vectors from the digital image and the extracting a plurality of feature vectors is performed using a first convolutional neural network, e.g., a ResNet50 neural network.

In some embodiments, the computer-implemented method further comprises removing background segments from the image. In some embodiments, removing background segments from the image is performed using a second convolutional neural network. In some embodiments, the second convolutional neural network is a semantic segmentation deep learning network.

In some embodiments, the final risk score is computed as a weighted average of the AI risk score and the clinical risk score, where the weights can be the same or different.

In some embodiments, the computer-implemented method further comprises selecting a subset of tiles for application to the machine learning model. In some embodiments, the subset of tiles is selected by random sampling.

In some embodiments, the machine learning model is trained using a plurality of training image and the plurality of training images comprise digital images of histologic sections of breast cancer samples derived from a plurality of control subjects having breast cancer. In some embodiments, the plurality of training images comprise images that lack local annotations. In some further embodiments, the plurality of training images comprise images associated with one or more global label(s) indicative of one or more disease feature(s) of the control patient from whom the sample is derived. In some embodiments, the one or more disease feature(s) are one or more of: duration of time to breast cancer relapse, subject age at the time of surgery, menopausal status, tumor stage, tumor size, number of positive nodes (N+), number of nodules, surgery type, treatment type, estrogen receptor (ER) status, progesterone receptor (PR) status, HER2 status, tumor grade, Ki67 expression, histological type, and/or presence or absence of one or more mutations in the BRCA gene or the TP53 gene, or a combination thereof.

In some embodiments, the one or more indicative disease feature(s) is duration of time to breast cancer relapse, survival rate, patient age at the time of surgery, tumor stage, tumor size, tumor location (e.g., unifocal, multifocal), number of positive nodes, and/or surgery type, status of one or more biomarker(s), tumor grade, and/or histological type, or a combination thereof.

In some embodiments, duration of time to breast cancer relapse and/or prognosis is assessed by, for instance, overall survival, invasive disease-free survival (iDFS), distant disease-free survival (dDFS), or metastasis-free interval (MFI).

As used herein, the "overall survival" refers to the time from diagnosis of a specific disease, e.g., breast cancer, to death from any cause. Overall survival rate refers to the percentage of subjects who are alive at a certain time after diagnosis, among all subjects diagnosed with a specific disease, e.g., breast cancer.

As used herein, the "invasive disease-free survival (iDFS)" in the context of breast cancer refers to the time from diagnosis of breast cancer to occurrence of any of the following: ipsilateral invasive breast cancer recurrence, regional invasive breast cancer recurrence, distant recurrence, death attributable to any cause, contralateral invasive breast cancer, or second non-breast invasive cancer.

As used herein, the "distant disease-free survival (dDFS)" in the context of breast cancer refers to the time from diagnosis to relapse at a distant site or death from any cause.

As used herein, the "metastasis-free interval (MFI)" in the context of breast cancer refers to the time from the diagnosis of primary nonmetastatic breast cancer to the date of the first distant metastases.

In some embodiments, the one or more biomarker(s) is one or more of estrogen receptor (ER) status, progesterone receptor (PR) status, HER2 status, and Ki67 expression. As used herein, estrogen receptor (ER) and progesterone receptor (PR) are well known receptors of hormones estrogen and progesterone, respectively.

As used herein, a "hormone receptor (HR)" status in the context of the present disclosure refers to an estrogen receptor (ER) status. HR-positive breast cancer cells or tissues are positive for ER.

ER (HR) and/or PR-positive breast cancers can be treated with hormone therapy drugs that lower the ligand (e.g., estrogen or progesterone) levels or block the receptors. ER (HR) and/or PR-positive cancers tend to grow more slowly than those that are ER (HR) and/or PR-negative. Without wishing to be bound by theory, subjects having ER (HR) and/or PR-positive breast cancers tend to have a better short-term prognosis compared to those having ER (HR) and/or PR-negative breast cancers, but with risks of relapse in a long term.

As used herein, human epidermal growth factor receptor 2 (HER2) refers to a growth-promoting receptor on the membrane of all breast cells. Breast cancer cells with higher than normal levels of HER2 are called HER2-positive. These cancers tend to grow and spread faster than other breast cancers, but are much more likely to respond to treatment with drugs that target the HER2 protein.

In some embodiments, the computer-implemented method of the present disclosure comprises obtaining one or more disease feature(s) of the patient, and applying a machine learning model to both the extracted features and the disease features of the patient, wherein one or more of the disease feature(s) of the patient are the same as one or more of the disease feature(s) represented in the global label(s) associated with the training images.

In some embodiments, the risk score represents the likelihood that the patient will experience a relapse within 5 years of the date that the breast cancer sample was derived from the patient.

As described above, in one embodiment, the risk score is calculated based on at least a machine learning model risk score and a clinical model risk score. In this embodiment, by using a combination of the machine learning and clinical models to determine a final risk score, the accuracy of the resulting model is increased. For example, and in one embodiment (see FIG. 6D left and Example 1), for a given validation training set of breast whole slide images for a group of known subject, the machine learning model risk score gives an Uno's time dependent Area Under the Curve (AUC) metric of 0.77 (e.g., a DeepMIL machine learning model described below), with a higher AUC representing a higher distinguishing capability of the models. With the same group of subjects, the clinical model based risk score (e.g., a Cox model) gives an AUC of 0.77. However, in this embodiment, by using an average of the machine learning model risk score and the clinical model risk score the resulting final risk score is increased to an AUC of 0.81. This is an unexpected increase in the AUC using a hybrid risk score (e.g., an average of the machine learning and clinical model risk scores) as the resulting risk score exhibits a better AUC than either the AI risk score and clinical model risk score.

In some embodiments, the machine learning model produces higher accuracy of breast cancer relapse prediction compared to a clinical model. In some embodiments, the machine learning model has a greater AUC for predicting breast cancer relapse by 0.01, 0.02, 0.03, 0.04, 0.05, 0.06, 0.07, 0.08, 0.09, 0.11, 0.12, 0.13, 0.14, 0.15, 0.16, 0.17, 0.18, 0.19, 0.20, 0.25, 0.30, 0.35, 0.40, or more compared to the clinical model.

In some embodiments, combining the machine learning and clinical models to produce a hybrid risk score produces higher accuracy of breast cancer relapse prediction compared to the machine learning model only or the clinical model only. In some embodiments, combining the machine learning and clinical models produces a greater AUC for predicting breast cancer relapse by 0.01, 0.02, 0.03, 0.04, 0.05, 0.06, 0.07, 0.08, 0.09, 0.11, 0.12, 0.13, 0.14, 0.15, 0.16, 0.17, 0.18, 0.19, 0.20, 0.25, 0.30, 0.35, 0.40, or more compared to the machine learning model only. In some embodiments, combining the machine learning and clinical models produces a greater AUC for predicting breast cancer relapse by 0.01, 0.02, 0.03, 0.04, 0.05, 0.06, 0.07, 0.08, 0.09, 0.11, 0.12, 0.13, 0.14, 0.15, 0.16, 0.17, 0.18, 0.19, 0.20, 0.25, 0.30, 0.35, 0.40, or more compared to the clinical model only.

FIG. 1 illustrates an example flow diagram for a process 100 that determines a breast cancer prognosis using machine learning and clinical models, according to embodiments of the present disclosure. At block 101, process 100 trains a machine learning model that can be used to compute a risk score for a relapse of breast cancer. In one embodiment, process 100 trains the machine learning model using a training set of digital image, where each digital image is a histologic section of a breast cancer sample derived from a patient. The digital image can include a digital WSI, in some embodiments.

In some embodiments, the histologic section of the breast cancer sample has been stained with a dye to visualize the underlying tissue structure, for example, with hematoxylin and eosin (H&E). Other common stains that can be used to visualize tissue structures in the input image include, for example, Masson's trichome stain, Periodic Acid Schiff stain, Prussian Blue stain, Gomori trichome stain, Alcian Blue stain, or Ziehl Neelsen stain. In some embodiments, the breast cancer sample is derived from a patient prior to treatment for breast cancer.

In this embodiment, the machine learning model can be a self-supervised machine learning model using histology data (such as whole slide images) by extracting features from tiles of the whole slide image. In one embodiment, feature extractor is trained on in-domain histology tiles, without annotations. In one embodiment, to apply a self-supervised framework on histology data, tiles are concatenated from all WSIs extracted at the tiling step to form a training dataset. The feature extractor is then trained with MoCo v2 on this set of unlabeled tile images. Initially, a set of tiles can be divided into two batches of tiles. A first batch of tiles and the second batch of tiles can be modified by, for example, adding 90° rotations and vertical flips, and also performing color augmentations. Since histology tiles contain the same information regardless of their orientation, rotations are good augmentations to perform. Because histology tiles are images that contain cells or tissue, and are not orientation dependent, such tiles can be viewed properly without regard for rotations, horizontal flip, etc. Thus, rotating the images provides a valuable augmentation without losing any important characteristics of the image. By applying the batches of tiles to their respective feature extractors, tile embeddings can be generated.

In one embodiment, the tile embeddings are the output of the feature extractors, and serve as a signature for each tile that includes semantic information for each tile. In other words, a tile embedding is a representation of a tile that contains semantic information about that tile.

In some embodiments, a self-supervised learning algorithm uses contrastive loss to shape the tile embeddings such that different augmented views of the same image are close together, or have similar tile embeddings. In other words, contrastive loss can compare the two tile embeddings, and based on that comparison the first feature extractor can be adjusted so that its tile embedding is similar to the tile embedding of the second feature extractor. Gradients are back-propagated through the first feature extractor. In some embodiments, the second feature extractor's weights are updated with an exponential moving average (EMA) of the first extractor's weights. The use of the EMA can avoid overfitting, in some embodiments. Thus, the output of this system is a trained feature extractor, which has been trained using in-domain histology tiles so that tile embeddings of various augmentations of the same image are similar. This type of specifically trained feature extractor can provide significant improvements in downstream performance, as discussed below. In some embodiments, the trained feature extractor can be achieved after training for a certain number of epochs. In some embodiments, training is performed until precision is at or near 1 (or 100%), until the AUC is at or near 1 (or 100%), or until the loss is near zero. In some embodiments, during training of a feature extractor with contrastive loss one may not have access to an abundance of helpful metrics. Thus, one can monitor one of the available metrics of downstream tasks, like AUC, to see how the feature extractor is performing. In one example, a feature extractor that is trained at a certain epoch can be used to train a downstream weakly supervised task in order to evaluate performance. If additional training could result in improved downstream performance, such additional training may be warranted.

In some embodiments, the second feature extractor can be optional, and a single feature extractor can be used to generate the tile embeddings from the two batches of tiles. In such an embodiment, one feature extractor is used to generate the tile embeddings from the two batches of tiles and contrastive loss is used, as described above, to compare the two tile embeddings, and adjust the first feature extractor so that the tile embedding is similar to the tile embedding.

At block 103, process 100 trains the clinical model. In one embodiment, process 100 trains a proportional hazards model using a set of clinical attributes that are associated with subject. In this embodiment, the clinical attributes can be age, treatment characteristics, biomarker characteristics (e.g., ER, PR, HER2, Ki67 status), histology characteristics (grade, histological subtype), tumor characteristics (tumor size, tumor stage, tumor location), node characteristics (number of invaded nodes). Furthermore, the clinical model can be a proportional hazard model that is a statistical model used to relates that time has passed before some event has happened (e.g., a relapse in breast cancer). For example, and in one embodiment, the proportional hazard model can be a Cox model that using a fitting algorithm to fit the training set clinical data (e.g., known relapse time and clinical attributes outlined above). Training the clinical model is further described in FIG. 3A below.

With the trained machine learning and clinical models, process 100 can receive a WSI and clinical attributes to determine a risk score for a subject. Process 10 receives a WSI and one or more clinical attributes for a subject at block 105. In one embodiment, the WSI is a digital image associated with the subject and the one or more clinical attributes are attributes that are used as input for the clinical model. At block 107, process 100 computes the AI risk score using the trained machine learning model. Computing the AI risk score is further described in FIG. 2B below. Process 100 computes the clinical risk score using the trained clinical model at block 111. Computing the clinical risk score is further described in FIG. 3B below.

With the computed machine learning and clinical risk scores for the subject, process 100 can compute the final risk score from the machine learning and clinical risk scores. In one embodiment, the final risk score is an average of the machine learning and clinical risk scores. For example, and in one embodiment, $$R_f = \frac{R_m + R_c}{2}$$

where $R_f$ is the final risk score, $R_m$ is the AI risk score, and $R_c$ is the machine clinical risk score. Alternatively, the final risk score can be a weighted average of the machine learning and clinical risk scores. For example, and in one embodiment, $$R_f = a_m R_m + a_m R_m$$

where $a_m$ and $a_m$ are the weights for $R_m$ and $R_c$, respectively. In a further embodiment, process 100 can compute the final risk score differently (e.g., square root sum of the squares or another function of two inputs).

Figure 2A:
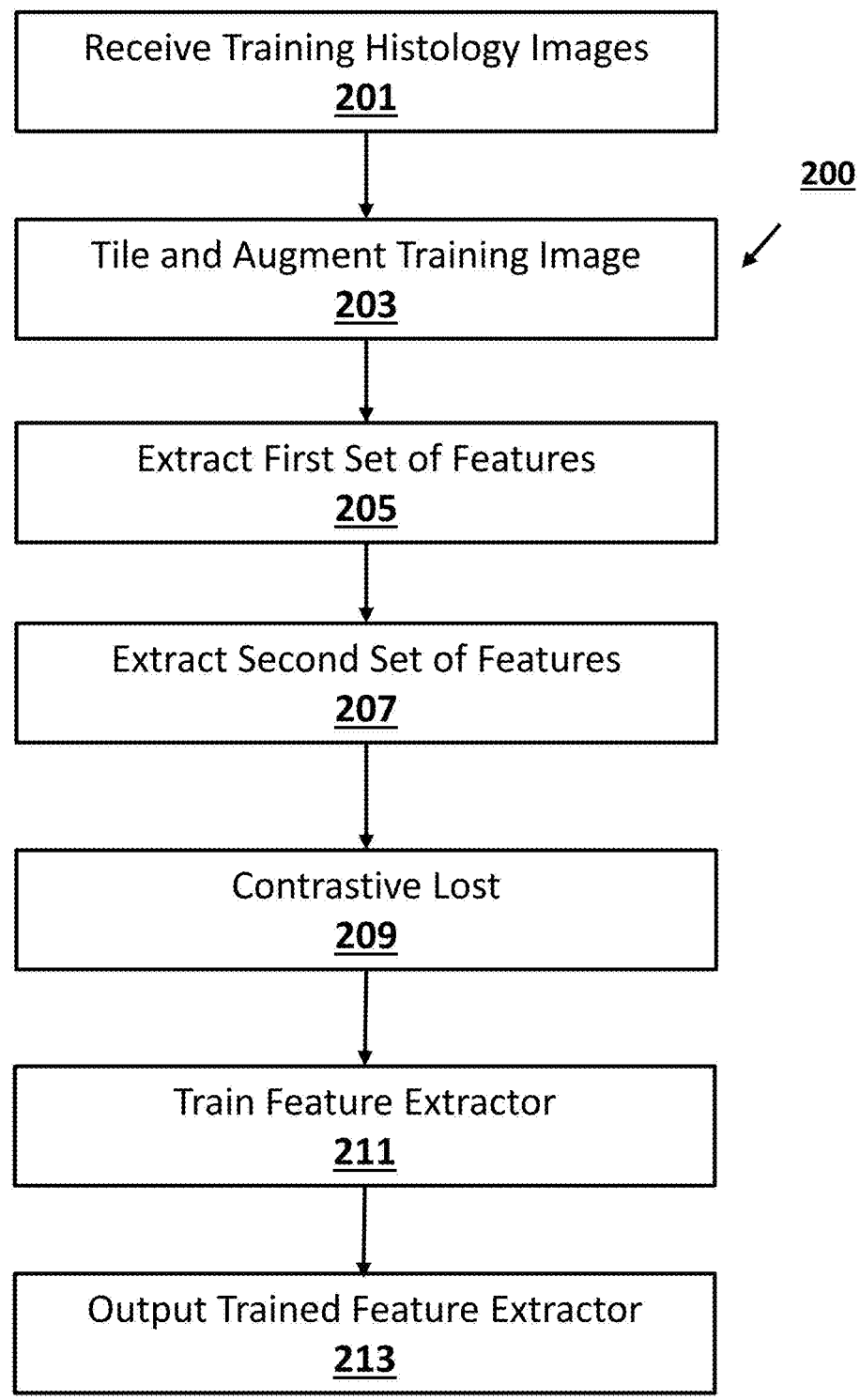
FIGS. 2A-2B illustrate example flow diagrams for a process of training and using a machine learning model for determining a risk score for breast cancer.
Figure 2B:
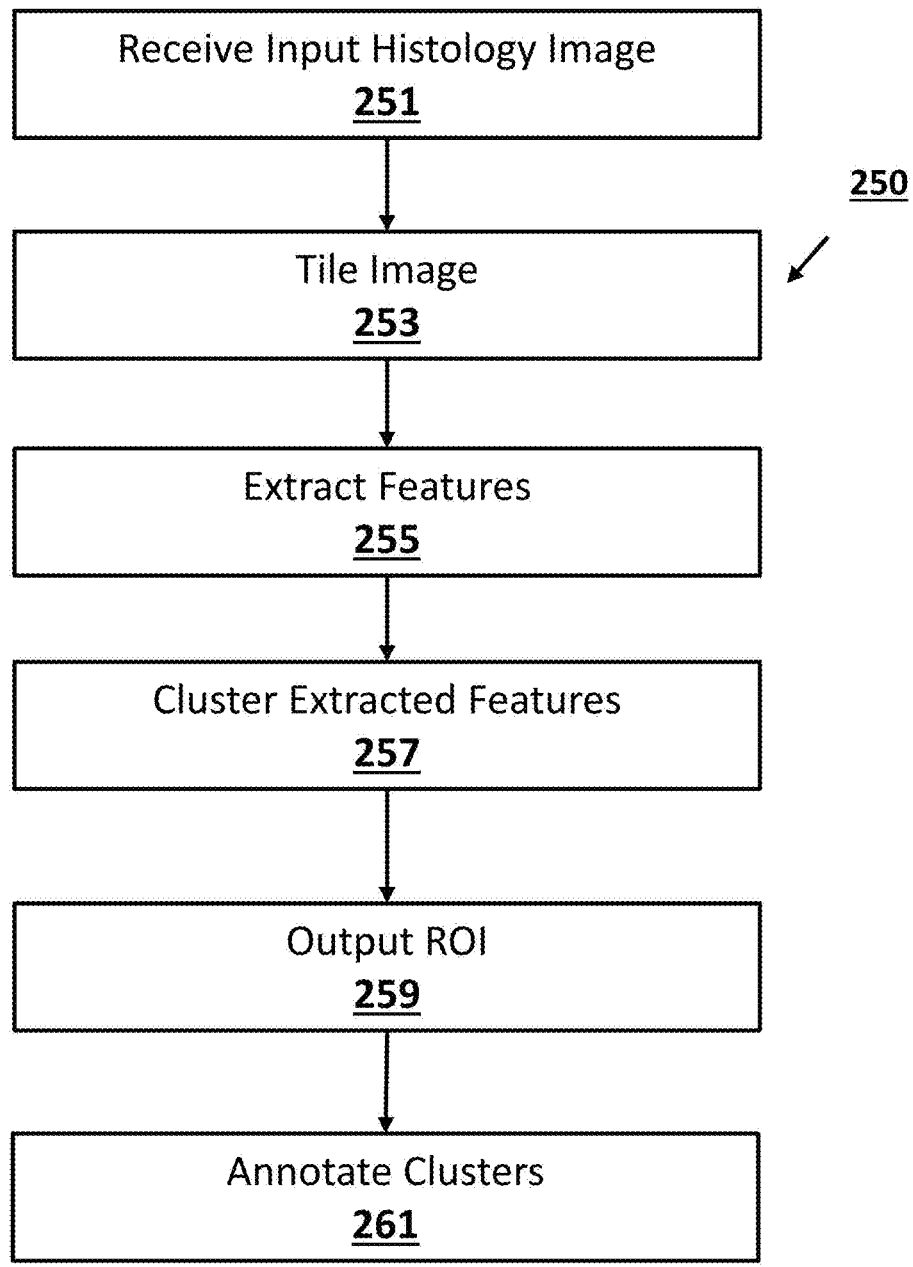

As per above, process 100 uses two trained models to arrive at the final risk score. FIGS. 2A-2B illustrate example flow diagrams for a process of training and using a machine learning model for determining a risk score for breast cancer. FIG. 2 is a flow diagram of one embodiment of a process 200 for using self-supervised learning on histology images to train a feature extractor, according to embodiments of the present disclosure. In FIG. 2, process 200 begins with receiving a training set of histology images 201. In some embodiments, each image in the training set of images is an annotation-free whole slide image.

At block 203, the process 200 continues with tiling and augmenting the training set of images into sets of tiles. In one embodiment, the digital image can be divided into a set of tiles. Tiling the image can include dividing the original image into smaller images that are easier to manage, called tiles. In one embodiment, the tiling operation is performed by applying a fixed grid to the whole-slide image, using a segmentation mask generated by a segmentation method, and selecting the tiles that contain tissue, or any other region of interest. In order to reduce the number of tiles to process even further, in one embodiment, additional or alternative selection methods can be used, such as random subsampling to keep only a given number of slides.

In one embodiment, augmentations may be applied to each of the sets of tiles. Process 200 continues with generating a processed set of tiles by, for each batch of tiles selected from the set of tiles, performing the following operations. At block 205, a first set of features is extracted from a first batch of augmented tiles. At block 207, a second set of features is extracted from a second batch of augmented tiles. In some embodiments, the augmented tiles include zoomed in or rotated views, or views with color augmentations. For example, since orientation is not important in histology slides, the slides can be rotated at various degrees. The slides can also be enlarged or zoomed in. At block 209, process 200 uses contrastive loss between pairs of the first and second set of extracted features in order to bring matching pairs of tiles closer and different pairs of tiles further apart. Contrastive loss is applied in order to pay attention to positive pairs taken from the first and second set of features, rather than negative pairs.

At block 211, process 200 continues with training a feature extractor using the processed set of tiles generated via operations 205-209. In some embodiments, the classification of histology images can be improved using the trained feature extractor disclosed herein. At block 213, process 200 continues with outputting a trained feature extractor that has been trained using a self-supervised ML algorithm. In some embodiments, a feature extractor can be trained for a particular number of epochs (e.g., 200 epochs), so that each training image is seen a particular number of times.

With the trained machine learning model, the risk score can be computed. FIG. 2B is a flow diagram of one embodiment of a process 250 for identifying regions of interest in a histology image, according to embodiments of the present disclosure. In FIG. 2B, process 250 begins with receiving an input histology image at block 251. In some embodiments, the input histology image is a WSI, and it can be derived from a patient tissue sample. In some embodiments, the patient tissue sample is known or suspected to contain a tumor.

In some embodiments, process 250 includes removing background segments from the input image. In some embodiments, matter detection can be used to take only tiles from tissue regions of the input image. In some embodiments, the background can be removed using Otsu's method applied to the hue and saturation channels after transformation of the input image into hue, saturation, value (HSV) color space.

At block 253, the process xcontinues with tiling the histology image into a set of tiles. In one embodiment, process 250 uses the tiling to increase the ability of preprocessing the images. For example, and in one embodiment, using a tiling method is helpful in histopathology analysis, due to the large size of the whole-slide image. More broadly, when working with specialized images, such as histopathology slides, or satellite imagery, or other types of large images, the resolution of the image sensor used in these fields can grow as quickly as the capacity of random-access memory associated with the sensor. With this increased image size, it is difficult to store batches of images, or sometimes even a single image, inside the random-access memory of a computer. This difficulty is compounded if trying to store these large images in specialized memory of a Graphics Processing Unit (GPU). This situation makes it computationally intractable to process an image slide, or any other image of similar size, in its entirety.

In one embodiment, tiling the image (or the image minus the background) addresses this challenge by dividing the original image (or the image minus the background), into smaller images that are easier to manage, called tiles. In one embodiment, the tiling operation is performed by applying a fixed grid to the whole-slide image, using the segmentation mask generated by the segmentation method, and selecting the tiles that contain tissue, or any other kind of region of interest for the later classification process. As used herein, the "region of interest" of an image could be any region semantically relevant for the task to be performed, in particular regions corresponding to tissues, organs, bones, cells, body fluids, etc. when in the context of histopathology. In order to reduce the number of tiles to process even further, additional or alternative selection methods can be used, such as random subsampling to keep only a given number of slides.

For example, and in one embodiment, process 250 divides the image (or the image minus the background) into tiles of fixed size (e.g., each tile having a size of 224×224 pixels). Alternatively, the tile size can be smaller or larger. In this example, the number of tiles generated depends on the size of the matter detected and can vary from a few hundred tiles to 50,000 or more tiles. In one embodiment, the number of tiles is limited to a fixed number that can be set based on at least the computation time and memory requirements (e.g., 10,000 tiles).

For each tile, process 250 continues with extracting one or more features of that tile at block 255. In one embodiment, each of the features are extracted by applying a trained feature extractor that was trained with a contrastive loss ML algorithm using a training set of images. In one embodiment, the training set of images is a set of annotation-free images. In one embodiment, the input image and the training set of images are from the same domain, meaning that they are of the same category or type of image. For example, the input image and the training set of images can both be histology images. This is in contrast to an embodiment where the training set of images includes out-of-domain images, or images that are not histology images, or are not of the same category or type as the images being analyzed. In one embodiment, the contrastive loss ML algorithm is Momentum Contrast, or Momentum Contrast v2 (MoCo v2). In some embodiments, the trained feature extractor is an ImageNet type of feature extractor. In one embodiment, the trained machine learning model is the machine learning model as trained in FIG. 2A described above.

In some embodiments, the machine learning model is a Deep Multiple Instance Learning model. In some embodiments, the machine learning model is a Weldon model. In some embodiments, the machine learning model is applied to the entire group of tiles. In some embodiments, the machine learning model is applied to a subset of tiles. The training images can include digital images of histologic sections of breast cancer samples derived from a number of control subjects. In some cases, the training images lack local annotations. The training images can include images associated with one or more global label(s) indicative of one or more disease feature(s) of the control patient from whom the sample is derived. The disease feature can include, in some embodiments, a duration of time to breast cancer relapse. In other embodiments, the one or more disease feature(s) can include one or more of patient age at the time of surgery, tumor stage, tumor size, number of positive nodes (N+), number of nodules, and/or surgery type, or a combination thereof. In other embodiments, the disease feature(s) can include one or more of estrogen receptor (ER) status, progesterone receptor (PR) status, HER2 status, tumor grade, Ki67 expression, and/or histological type, or a combination thereof.

In some embodiments, one or more disease features of a patient can be obtained, and a machine learning model is applied to both the extracted features and the disease features of the patient. Example disease features of the patient can be the same as the disease features represented in the global labels associated with the training images.

At block 259, process 250 computes a risk score for the subject using the machine learning model. The risk score represents the likelihood that the patient will experience a relapse following treatment, and may be expressed as a classification or a continuous range. In one embodiment, the risk score represents the likelihood that the patient will experience relapse within five years of the date that the breast cancer sample was derived from the patient.

Figure 3A:
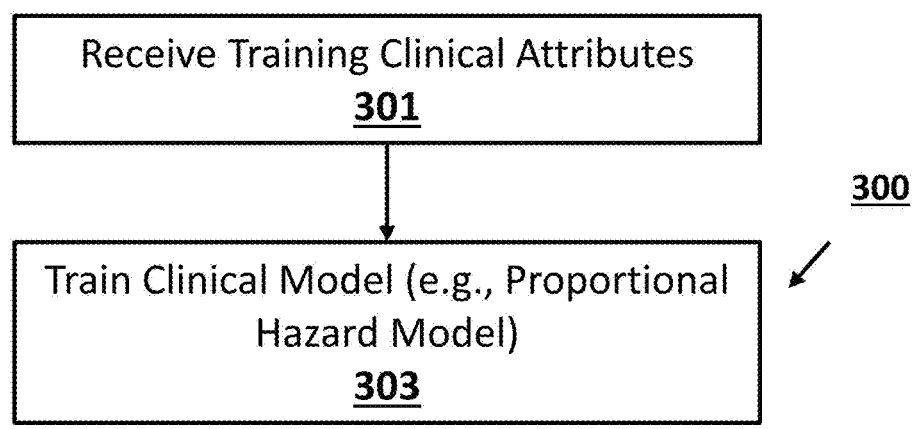
FIGS. 3A-3B illustrate example flow diagrams for a process of training and using a clinical model for determining a risk score for breast cancer.
Figure 3B:
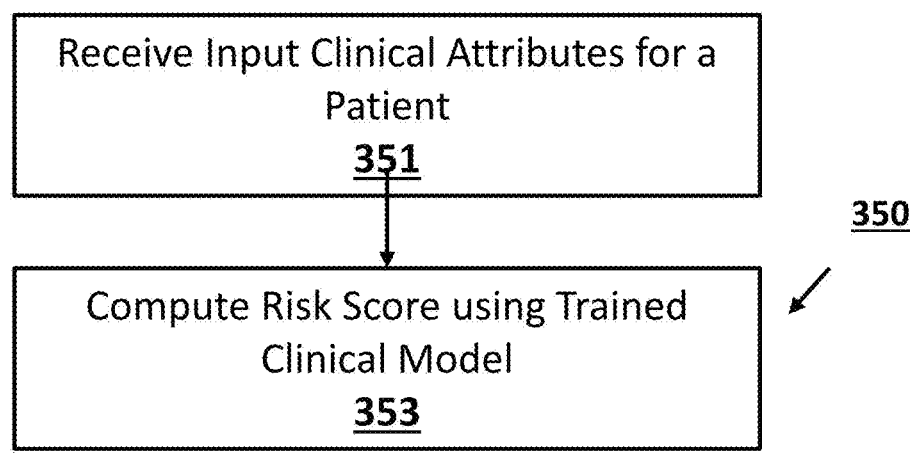

In addition to the AI risk score that is computed using trained machine learning model, a clinical model is trained and used to compute a clinical risk score. FIGS. 3A-3B illustrate example flow diagrams for a process of training and using a clinical model for determining a risk score for breast cancer. In FIG. 3A, process 300 begins by receiving the training clinical attributes and risk score results for a training set of subject at block 301. In one embodiment, the training clinical attributes can be one or more of: age at surgery, tumor stage (pT), tumor size, number of cancer-positive nodes (N+), number of nodules, surgery type, hormone receptor (e.g., ER, PR, HER2) status, Ki67 status, tumor grade, histological type, and genetic abnormality. At block 303, process 300 trains the clinical model using the training set of clinical attributes and risk scores.

With the trained model, the clinical risk score can be computed. FIG. 3B illustrates an example flow diagram for a process 350 that determines a risk score computed using a clinical model, according to embodiments of the present disclosure. In FIG. 3B, process 350 begins by receiving input clinical attributes for a subject at block 351. At block 353, process 350 computes the risk score using the trained clinical model. As described above, the clinical risk score can be combined with an AI risk score to arrive at a final risk score.

II. Methods of Predicting Status of Biomarkers in Breast Cancer

In some aspects, provided herein is a computer-implemented method of predicting a status of a biomarker in a breast cancer tissue. In some aspects, the same model for predicting risk of breast cancer relapse can be used for predicting a status of a biomarker in a breast cancer tissue. In some aspects, said method for predicting a biomarker comprises:

obtaining a digital image of a histologic section of a breast cancer sample derived from a subject;

dividing the digital image into a set of tiles;

extracting a plurality of feature vectors from the set of tiles, or a subset thereof;

computing a biomarker status using a machine learning model, which has been trained by processing a plurality of training images to predict a status of a biomarker.

In some embodiments, the biomarker is estrogen receptor (ER), progesterone receptor (PR), HER2, or Ki67. In some embodiments, the status of the marker to be predicted is positive or negative. In some embodiments, the status of the marker to be predicted is expressed as a value within a continuous range of values, wherein:

the lowest and highest ends of the range indicate the lowest and highest detection limit levels of the marker within the tissue, respectively; or the lowest and highest ends of the range indicate the highest and lowest detection limit levels of the marker within the tissue.

In some embodiments, the digital image used in accordance with the methods of the present disclosure is a whole slide image.

In some embodiments, the histologic section of the breast cancer sample has been stained with a dye. In some embodiments, the dye is Haemotoxylin and Eosin (H&E).

In some embodiments, the machine learning model is a Deep Multiple Instance Learning (DeepMIL) model. In some embodiments, the machine learning model is a Weldon model. In some embodiments, the machine learning model is a Multi-Layer Perception model.

In some embodiments, the machine learning algorithm is a self-supervised learning algorithm. In some embodiments, the self-supervised learning algorithm is Momentum Contrast (MoCo) or Momentum Contrast v2. In some embodiments, the self-supervised learning algorithm is DeepMIL. In some embodiments, a DeepMIL model is trained on histology images using MoCo or MoCo v2. In some embodiments, a DeepMIL model is trained on histology images using ImageNet. The computer-implemented method of predicting a status of a biomarker in a breast cancer tissue can incorporate any features or algorithms described elsewhere in the present disclosure.

In some embodiments, extracting a plurality of feature vectors is performed using a first convolutional neural network. In some embodiments, the first convolutional neural network is a ResNet50 neural network. In some embodiments, a software platform for training and using machine learning models can be used to analyze the digitalized pathology slides and predict the status of biomarkers in the tissue.

In some embodiments, the method further comprises removing background segments from the image. In some embodiments, removing background segments from the image is performed using a second convolutional neural network. In some embodiments, the second convolutional neural network is a semantic segmentation deep learning network.

In some embodiments, the methods of the present disclosure further comprises selecting a subset of tiles for application to the machine learning model. In some embodiments, the subset of tiles is selected by random sampling.

In some embodiments, the machine learning model is trained using a plurality of training image and the plurality of training images comprise digital images of histologic sections of breast cancer samples derived from a plurality of control subjects. In further embodiments, the plurality of training images comprise images that lack local annotations. In some embodiments, the plurality of training images comprise images associated with one or more global label(s) indicative of one or more disease feature(s) of the control subject from whom the sample is derived.

In some embodiments, the one or more indicative disease feature(s) include a status of one or more biomarker(s) or a combination thereof, e.g., ER, PR, HER2, Ki67.

In some embodiments, the method comprises obtaining one or more disease features of the subject, and applying a machine learning model to both the extracted features and the disease features of the subject, wherein one or more of the disease feature(s) of the subject are the same as one or more of the disease feature(s) represented in the global label(s) associated with the training images.

In some embodiments, the machine learning models of the present disclosure can identify novel biomarkers for diagnosis and prognosis of breast cancer based on the histology information provided, e.g., WSIs.

III. Computer System and Machine Readable Medium

Figure 20:
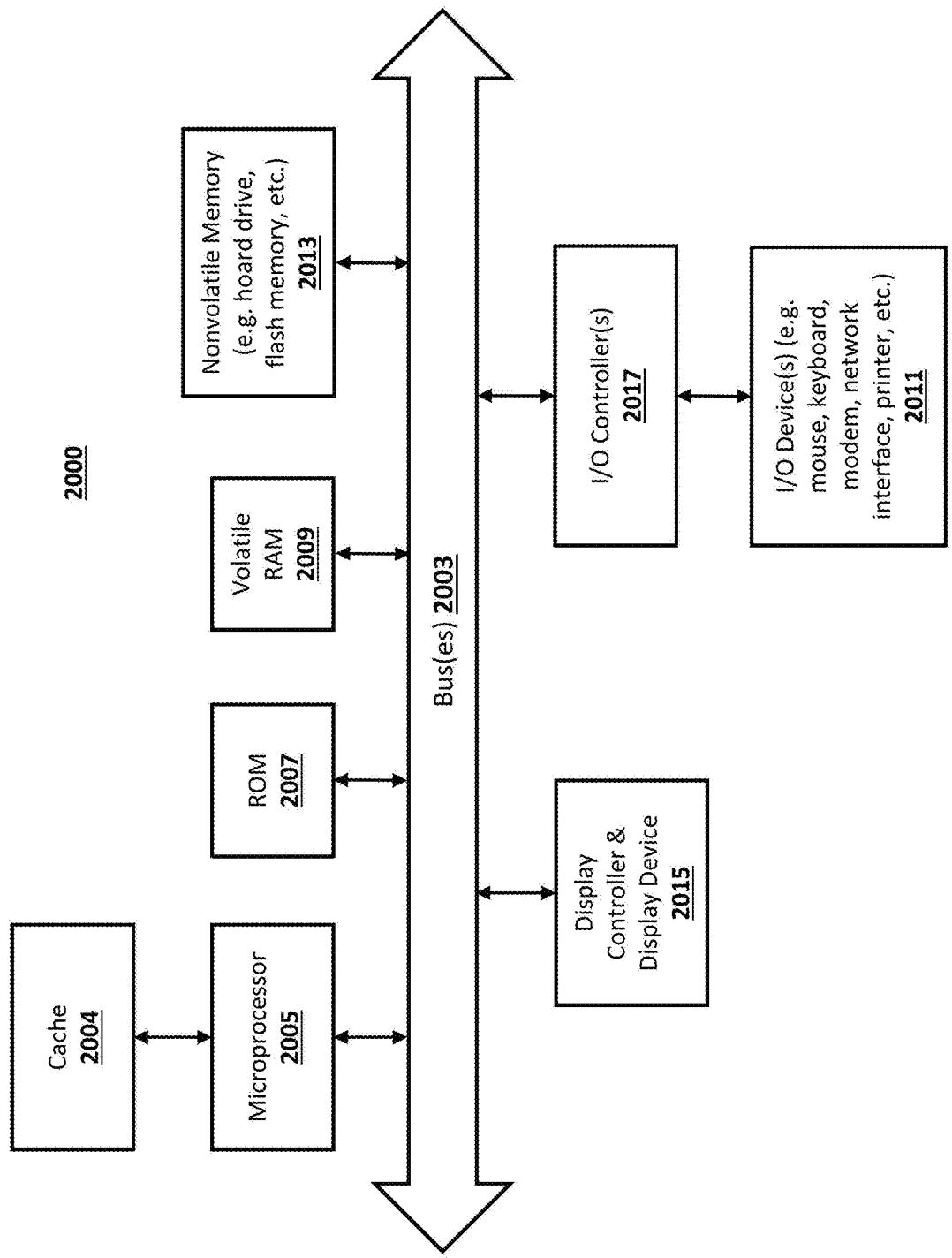
FIG. 20 illustrates an example of a computer system, which may be used in conjunction with the embodiments described herein.

As shown in FIG. 20, the computer system 2000, which is a form of a data processing system, includes a bus 2003 which is coupled to a microprocessor(s) 2005 and a ROM (Read Only Memory) 2007 and volatile RAM 2009 and a non-volatile memory 2013. The microprocessor 2005 may include one or more CPU(s), GPU(s), a specialized processor, and/or a combination thereof. The microprocessor 905 may be in communication with a cache 2004, and may retrieve the instructions from the memories 2007, 2009, 2013 and execute the instructions to perform operations described above. The bus 2003 interconnects these various components together and also interconnects these components 2005, 2007, 2009, and 2013 to a display controller and display device 2015 and to peripheral devices such as input/output (I/O) devices 2011 which may be mice, keyboards, modems, network interfaces, printers and other devices which are well known in the art. Typically, the input/output devices 2011 are coupled to the system through input/output controllers 2017. The volatile RAM (Random Access Memory) 2009 is typically implemented as dynamic RAM (DRAM), which requires power continually in order to refresh or maintain the data in the memory.

The nonvolatile memory 2013 can be, for example, a magnetic hard drive or a magnetic optical drive or an optical drive or a DVD RAM or a flash memory or other types of memory systems, which maintain data (e.g. large amounts of data) even after power is removed from the system. Typically, the nonvolatile memory 2013 will also be a random access memory although this is not required. While FIG. 20 shows that the nonvolatile memory 2013 is a local device coupled directly to the rest of the components in the data processing system, it will be appreciated that the present invention may utilize a nonvolatile memory which is remote from the system, such as a network storage device which is coupled to the data processing system through a network interface such as a modem, an Ethernet interface or a wireless network. The bus 2003 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "segmenting," "tiling," "receiving," "computing," "extracting," "processing," "applying," "augmenting," "normalizing," "pre-training," "sorting," "selecting," "aggregating," "sorting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description herein. In addition, the present invention is not described with reference to any particular programming language. It will be appreciated that a variety of programming languages may be used to implement the teachings of the invention as described herein.

IV. Products

In some aspects, provided herein is a product capable of identifying subjects that are at a high risk of relapse of breast cancer, identifying areas of histology sections of a tumor that are at a high risk or a low risk of relapse, identifying tumor or malignant regions within a WSI, and/or identifying status of biomarkers related to breast cancer in a tumor of a subject. In some aspects, the product is attached to a scanner. In some aspects, the scanner is capable of scanning pathology slides, e.g., H&E slides. In some aspects, the product is particularly useful for health care facilities, clinics, or providers, including those without expertise for breast cancer pathology, including making diagnosis or prognosis of breast cancer, or access to molecular tests. In some aspects, the product is useful for identifying personalized medicine or targeted therapy options for breast cancer in a subject.

EXAMPLES

Example 1

Prediction of Relapse of Breast Cancer Using H&E Whole Slide Images (i) Study Cohort A cohort of 1813 subjects diagnosed with early breast cancer (Grand TMA) at Gustave Roussy between 2005 and 2013 were included in the study. Among this total population, 1437 subjects were diagnosed with ER+HER2− breast cancer between 2005 and 2013. Some analysis of the present study focused on this subpopulation, as described elsewhere in this disclosure. All subjects of the cohort underwent surgical resection, with full follow-up and an available hematoxylin-eosin (H&E) stained glass slide.

Clinical and pathological data collected and considered include, but are not limited to, age, tumor size, grade, histologic type, pT, pN, mutations (in, e.g., BRCA or TP53 genes), molecular subtype, HER2, Ki67, RE, and RP. Treatment data considered included surgery type, history of radiation therapy, history of hormone therapy, and chemotherapy type.

(ii) Assessment of Survival

Figure 4A:
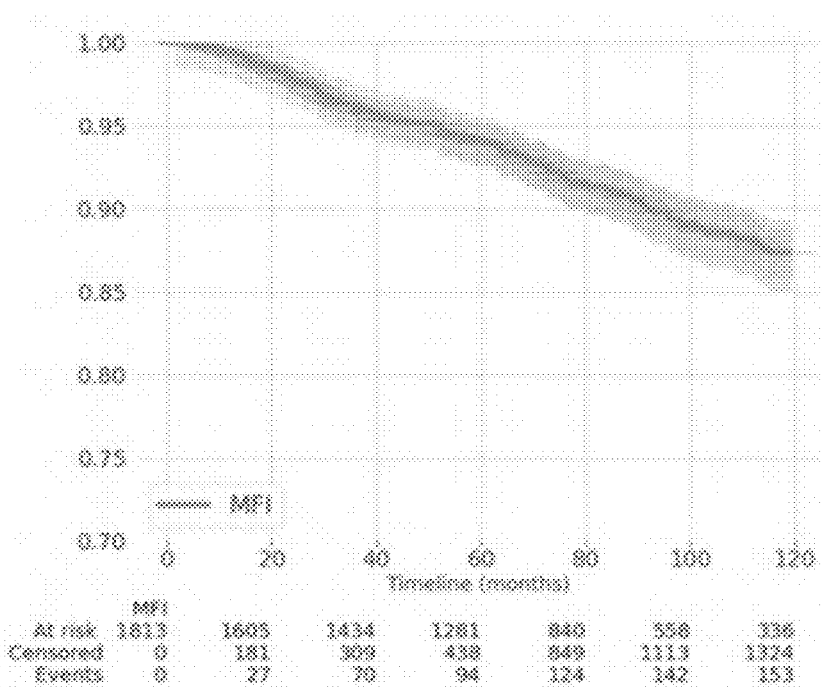
FIG. 4A depicts a metastasis-free interval (MFI) curve of the study cohort calculated including censored subjects in the base population in accordance with the present disclosure.
Figure 4B:
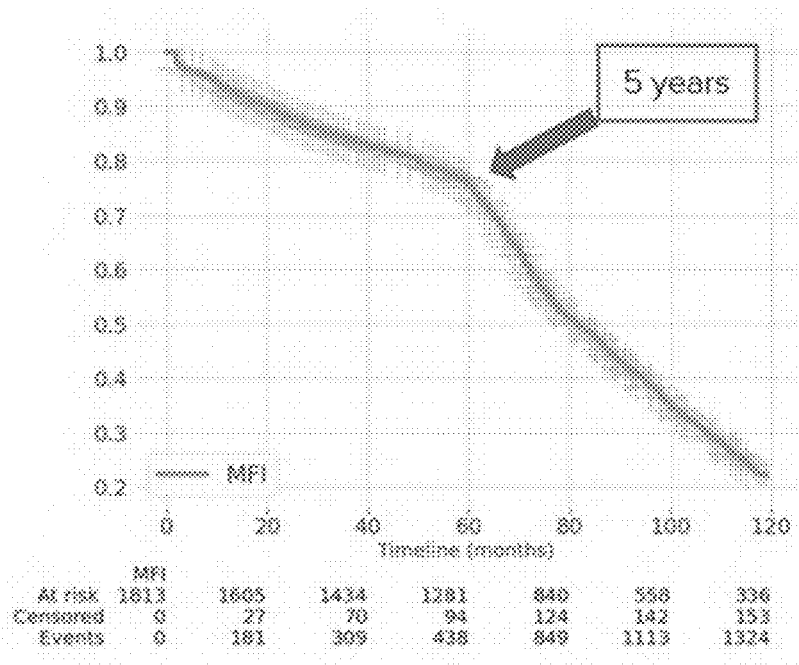
FIG. 4B depicts a survival curve with censoring for the MFI endpoint.

In monitoring the subjects enrolled in the study, four different survival endpoints were considered, including overall survival, invasive disease-free survival (iDFS), distant disease-free survival (dDFS), and metastasis-free interval (MFI) starting at the time of diagnosis (t=0). In FIGS. 4A and 4B, "at risk" refers to subjects who were initially diagnosed with breast cancer but have not developed metastasis. "Censored" refers to subjects who left the study or those for whom data is unavailable. "Events" refers to subjects with breast cancer who have developed metastasis. As shown in FIGS. 4A, the MFI survival curve (events/events+at risk+censored) showed a gradual and continued decline over 120 months (10 years). As shown in FIG. 4B, the MFI curve for censoring showed a gradual decline from 0 to 60 months (5 years) followed by a sharper decline from 60 to 120 months (5-10 years). The sharper decline at 5 years and thereafter may be attributable to a large number of censored subjects including those who are no longer followed up by the health care facility after 5 years of disease-free survival.

(iii) Deep Learning

AI risk scores were computed based on WSIs of breast tissues as follows. A H&E stained glass slide, which was available from all subjects enrolled in the present study, was digitized, preprocessed, and cut into small patches. These tiles were fed into a deep learning ("DL") network, i.e., DeepMIL MoCo v2 or DeepMIL ImageNet. Initially, the machine learning model was trained with Momentum Contrast v2 (MoCo v2) or ImageNet by receiving and processing training tiles as shown in FIG. 2A according to the present disclosure. Subsequently, the trained ML model received the tiles generated from WSI and an AI risk score representing risk of relapse was computed based on a weighted average of tile features as shown in FIG. 2B according to the present disclosure.

Figure 5A:
FIGS. 5A-5B show an exemplary comparison of a tumor annotated by a pathologist (FIG. 5A) and a tumor prediction (FIG. 5B) generated based on WSIs using Multi-Layer Perception with MoCo features according to an embodiment of the present disclosure.
Figure 5B:
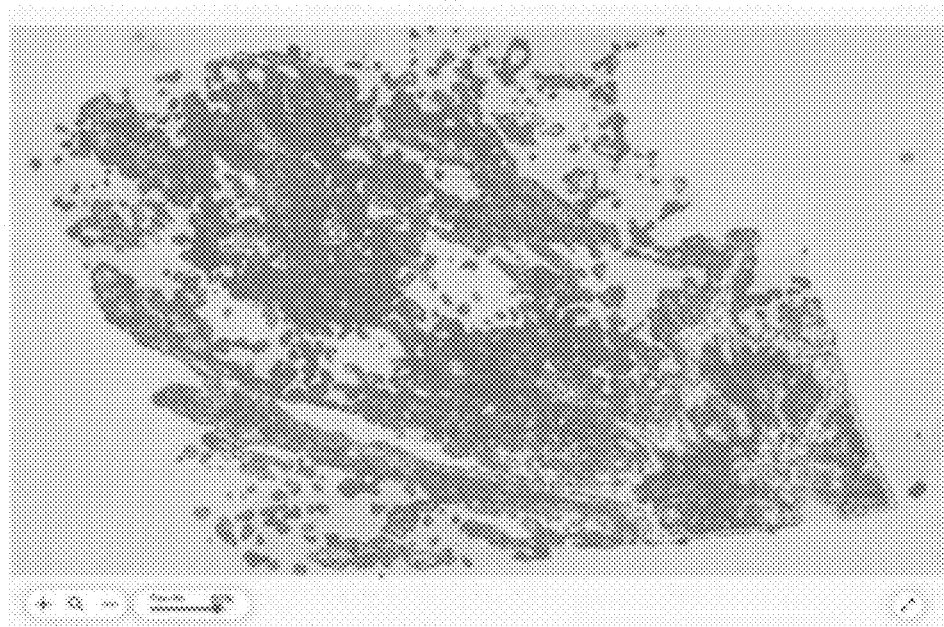

FIG. 5A shows an exemplary tumor within a WSI annotated by a pathologist in a software platform for training and using machine learning models for diagnosis and prognosis). FIG. 5B shows tumor prediction within a WSI using Multi- Layer Perception with MoCo features in the platform. As shown in FIG. 5B, upon feeding a tile or a WSI, the machine learning model is able to predict and identify a tumor location in the tile or the WSI.

In addition to the DL model applied to WSIs, clinical risk scores were determined using clinical variables as follows. Initially, a Cox model was trained by receiving the training clinical attributes and risk score results for a training set of subjects as shown in FIG. 3A and in accordance with the present disclosure. Clinical attributes included baseline clinical variables (BV) (age at surgery, tumor stage (pT), tumor size, number of tumor nodules, number of invaded nodes, surgery type) as well as extended clinical variables (EV) [combining BV with ER/PR/HER2/Ki67 Status, tumor grade, histological type, and genetic mutation status (e.g., BRCA, TP53)]. Subsequently, the trained Cox model received clinical attributes and a clinical risk score representing risk of relapse was computed based on a weighted average of clinical features as shown in FIG. 3B according to the present disclosure.

In some models, a final risk score was determined for a subject based on the AI risk score based on WSI and the clinical risk score based on clinical attributes. The final risk score was calculated as an average of the machine learning and clinical risk scores.

In each model, performance was evaluated using cross-validation. Metastasis free interval (MFI) was chosen as the primary survival endpoint. Uno's time dependent AUC was used as a metric to quantify the discrimination capability of the models.

(iv) Results—Deep Learning-Based Prediction of Risk of Relapse

Figure 6A:
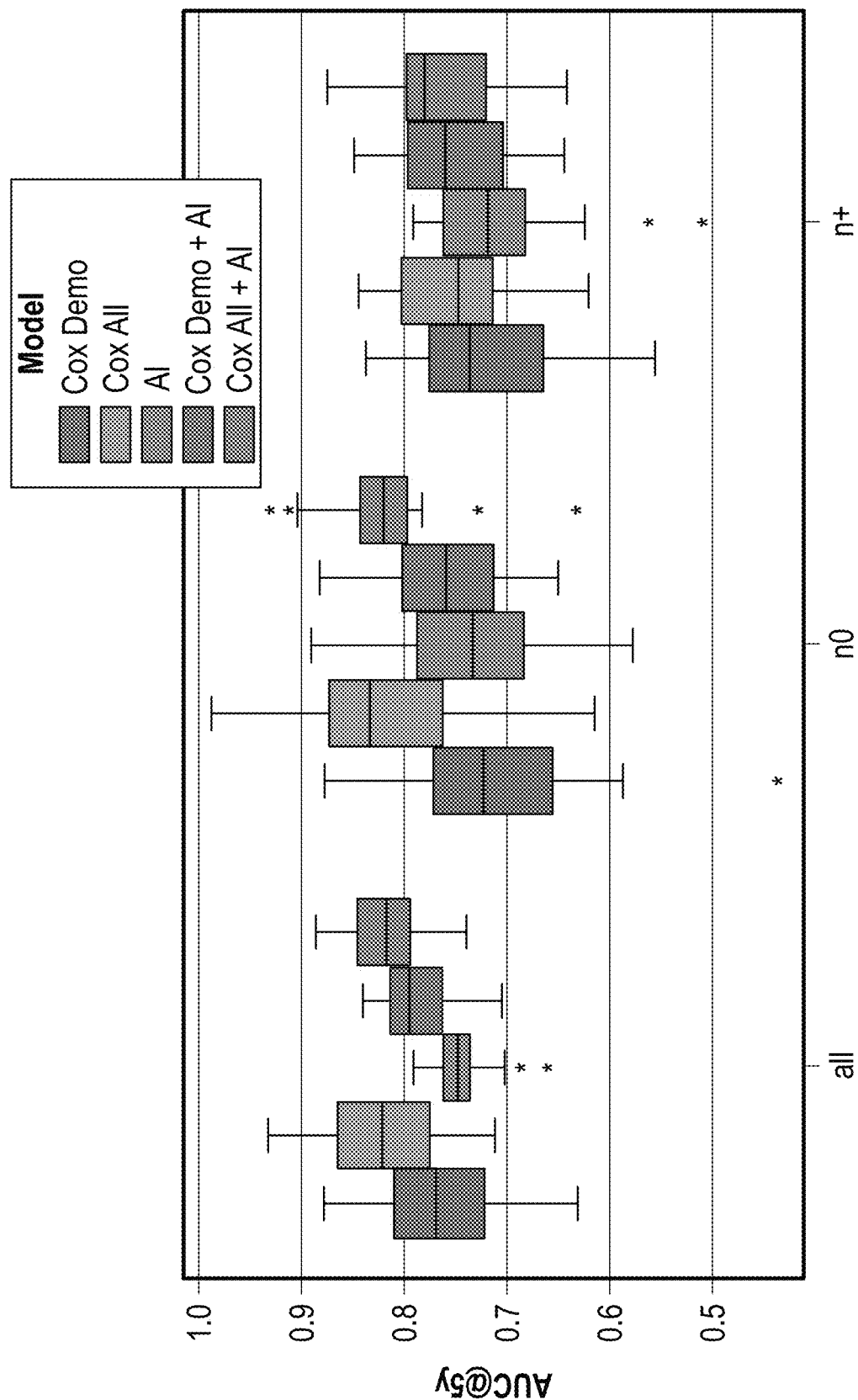
FIGS. 6A-6D show comparison of breast cancer relapse prediction (MFI) at 5 years after diagnosis in a certain population by a Cox model based solely on baseline clinical variables (BV) ("Cox demo"), a Cox model based on extended clinical variables (EV) ("Cox all"), a deep learning (DL) model based solely on WSI ("AI"), combination of BV with the DL model ("Cox demo+AI"), and combination of EV with the DL model ("Cox all+AI"). Uno's time dependent AUC at 5 years was used as a metric to quantify the discrimination capability of the models.

FIG. 6A depicts cross-validation results of risk of relapse in the entire study cohort using DeepMIL MoCo v2 and/or clinical risk scores. As shown in the "all" group in FIG. 6A (left panel), in the total population (n=1800), the prediction of 5-year survival (MFI) based solely on baseline clinical variables (BV) yielded an AUC of 0.76 ("Cox demo") and a model based on extended clinical variables (EV) yielded an AUC of 0.82 ("Cox all"). The DeepMIL MoCo v2 based solely on WSI yielded an AUC of 0.74 ("AI"). Combining BV with the DeepMIL MoCo v2 resulted in an improved AUC of 0.79 ("Cox demo+AI"). Combining EV with the DeepMIL MoCo v2 resulted in an AUC of 0.82 ("Cox all+AI").

As shown in the "n0" group in FIG. 6A (middle panel), in the subpopulation of subjects who had no lymph node metastasis at the time of diagnosis (NO; n=1180), the prediction of 5-year survival (MFI) based solely on BV yielded an AUC of 0.72 ("Cox demo") and a model based on EV yield yielded an AUC of 0.82 ("Cox all"). The DeepMIL MoCo v2 based solely on WSI yielded an AUC of 0.73 ("AI"). Combining BV with the DeepMIL MoCo v2 resulted in an improved AUC of 0.76 ("Cox demo+AI"). A Combining EV with the DeepMIL MoCo v2 resulted in an AUC of 0.82 ("Cox all+AI").

As shown in the "n+" group in FIG. 6A (right panel), in the subpopulation of subjects who had lymph node metastasis at the time of diagnosis (N+; n=615), the prediction of 5-year survival (MFI) based solely on BV yielded an AUC of 0.71 ("Cox demo") and a model based on EV yielded an AUC of 0.75 ("Cox all"). The DeepMIL MoCo v2 based solely on WSI yielded an AUC of 0.70 ("AI"). Combining BV with the DeepMIL MoCo v2 resulted in an improved AUC of 0.75 ("Cox demo+AI"). A model based on. Combining EV with the DeepMIL MoCo v2 resulted in an improved AUC of 0.76 ("Cox all+AI").

Figure 6B:
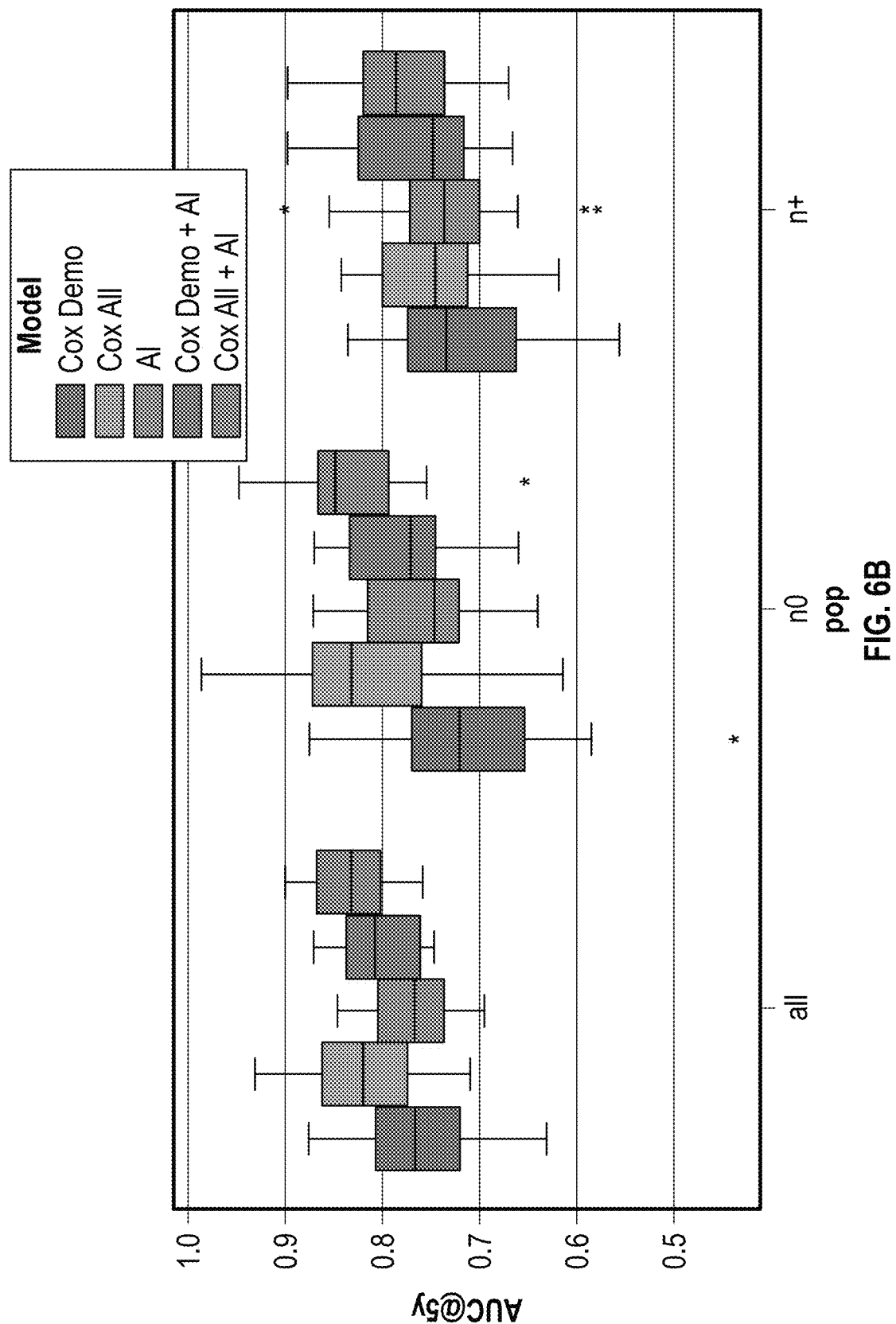

FIG. 6B depicts cross-validation results of risk of relapse in the entire study cohort using DeepMIL ImageNet and/or clinical risk scores. As shown in the "all" group in FIG. 6B (left panel), in the total population (n=1800), the prediction of 5-year survival (MFI) based solely on BV yielded an AUC of 0.76 ("Cox demo") and a model based on EV yielded an AUC of 0.82 ("Cox all"), as also shown in FIG. 6A (left panel). The DeepMIL ImageNet based solely on WSI yielded an AUC of 0.77 ("AI"). Combining BV with the DeepMIL ImageNet resulted in an improved AUC of 0.81 ("Cox demo+AI"). Combining EV with the DeepMIL ImageNet resulted in an improved AUC of 0.83 ("Cox all+AI").

As shown in the "n0" group in FIG. 6B (middle panel), in the subpopulation of subjects who had no lymph node metastasis at the time of diagnosis (NO; n=1180), the prediction of 5-year survival (MFI) based solely on BV yielded an AUC of 0.72 ("Cox demo") and a model based on EV yielded an AUC of 0.82 ("Cox all"), as also shown in FIG. 6A (middle panel). On the other hand, the DeepMIL ImageNet DeepMIL ImageNet based solely on WSI yielded an AUC of 0.76 ("AI"). Combining BV with the DeepMIL ImageNet resulted in an improved AUC of 0.78 ("Cox demo+AI"). Combining EV with the DeepMIL ImageNet resulted in an improved AUC of 0.83 ("Cox all+AI").

As shown in the "n+" group in FIG. 6B (right panel), in the subpopulation of subjects who had lymph node metastasis at the time of diagnosis (N+; n=615), the prediction of 5-year survival (MFI) based solely on BV yielded an AUC of 0.71 ("Cox demo") and a model based on EV yielded an AUC of 0.75 ("Cox all"), as also shown in FIG. 6A (right panel). On the other hand, the DeepMIL ImageNet DeepMIL ImageNet based solely on WSI yielded an AUC of 0.74 ("AI"). Combining BV with the DeepMIL ImageNet resulted in an improved AUC of 0.77 ("Cox demo+AI"). Combining EV with the DeepMIL ImageNet resulted in an improved AUC of 0.79 ("Cox all+AI").

Figure 6C:
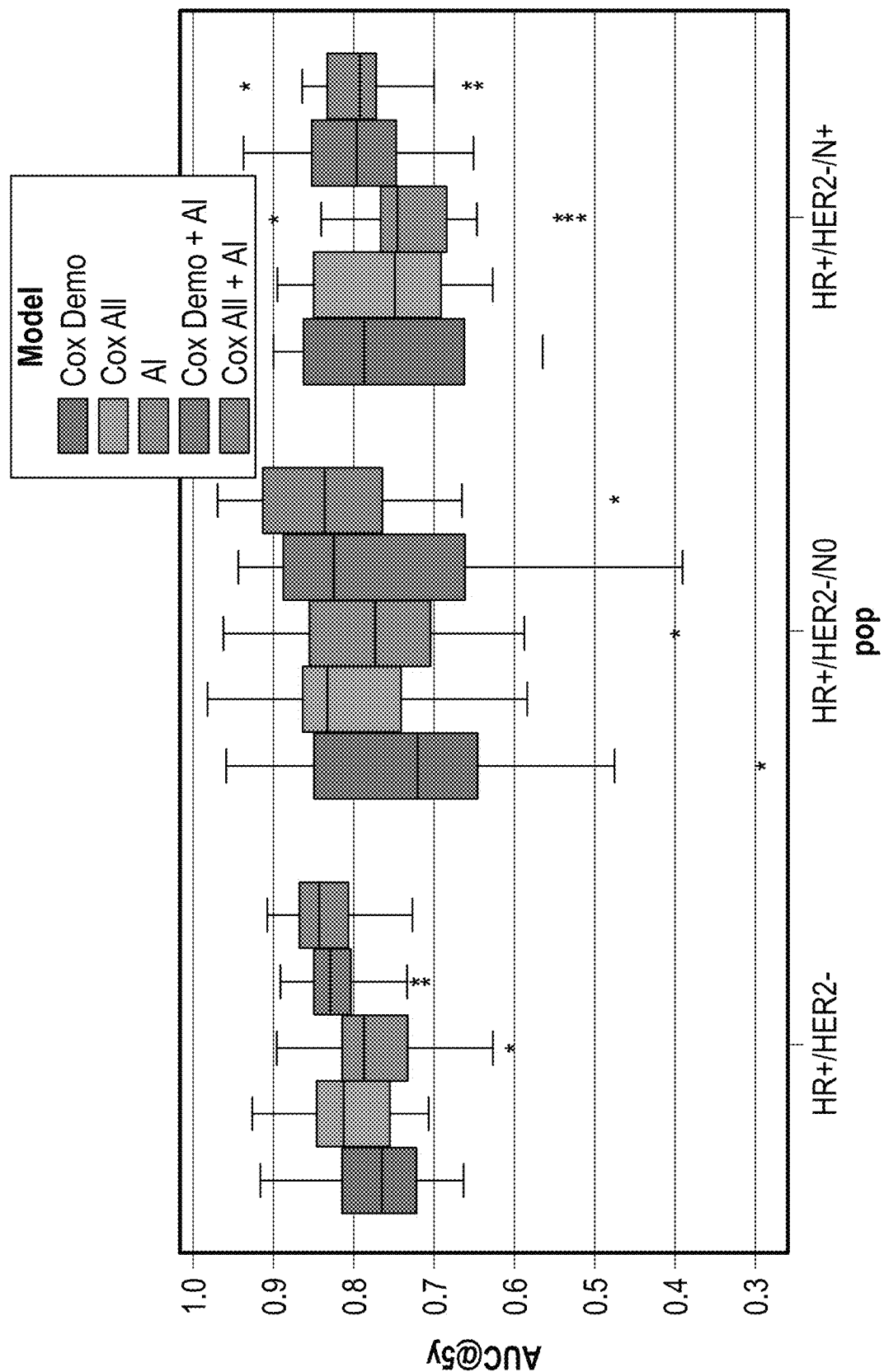

FIG. 6C depicts cross-validation results of risk of relapse in the ER+/HER2− subpopulation using DeepMIL MoCo v2 and/or clinical risk scores. As shown in the "all" group in FIG. 6C (left panel), in the population of ER+/HER2− subjects (n=1437), the prediction of 5-year survival (MFI) based solely on BV yielded an AUC of 0.77 ("Cox demo") and a model based on EV yielded an AUC of 0.80 ("Cox all"). The DeepMIL MoCo v2 based solely on WSI yielded an AUC of 0.77 ("AI"). Combining BV with the DeepMIL MoCo v2 resulted in an improved AUC of 0.81 ("Cox demo+AI"). Combining EV with the DeepMIL MoCo v2 resulted in an improved AUC of 0.83 ("Cox all+AI").

As shown in the "all" group in FIG. 6C (middle panel), in the subpopulation of ER+/HER2−/N0 subjects (n=957), the prediction of 5-year survival (MFI) based solely on BV yielded an AUC of 0.72 ("Cox demo") and a model based on EV yielded an AUC of 0.81 ("Cox all"). The DeepMIL MoCo v2 based solely on WSI yielded an AUC of 0.77 ("AI"). Combining BV with the DeepMIL MoCo v2 resulted in an AUC of 0.77 ("Cox demo+AI"). Combining EV with the DeepMIL MoCo v2 resulted in an improved AUC of 0.82 ("Cox all+AI").

As shown in the "all" group in FIG. 6C (right panel), in the subpopulation of ER+/HER2−/N+subjects (n=480), the prediction of 5-year survival (MFI) based solely on BV yielded an AUC of 0.76 ("Cox demo") and a model based on EV yielded an AUC of 0.76 ("Cox all"). The DeepMIL MoCo v2 based solely on WSI yielded an AUC of 0.73 ("AI"). Combining BV with the DeepMIL MoCo v2 resulted in an improved AUC of 0.80 ("Cox demo+AI"). Combining EV with the DeepMIL MoCo v2 resulted in an improved AUC of 0.79 ("Cox all+AI").

Figure 6D:
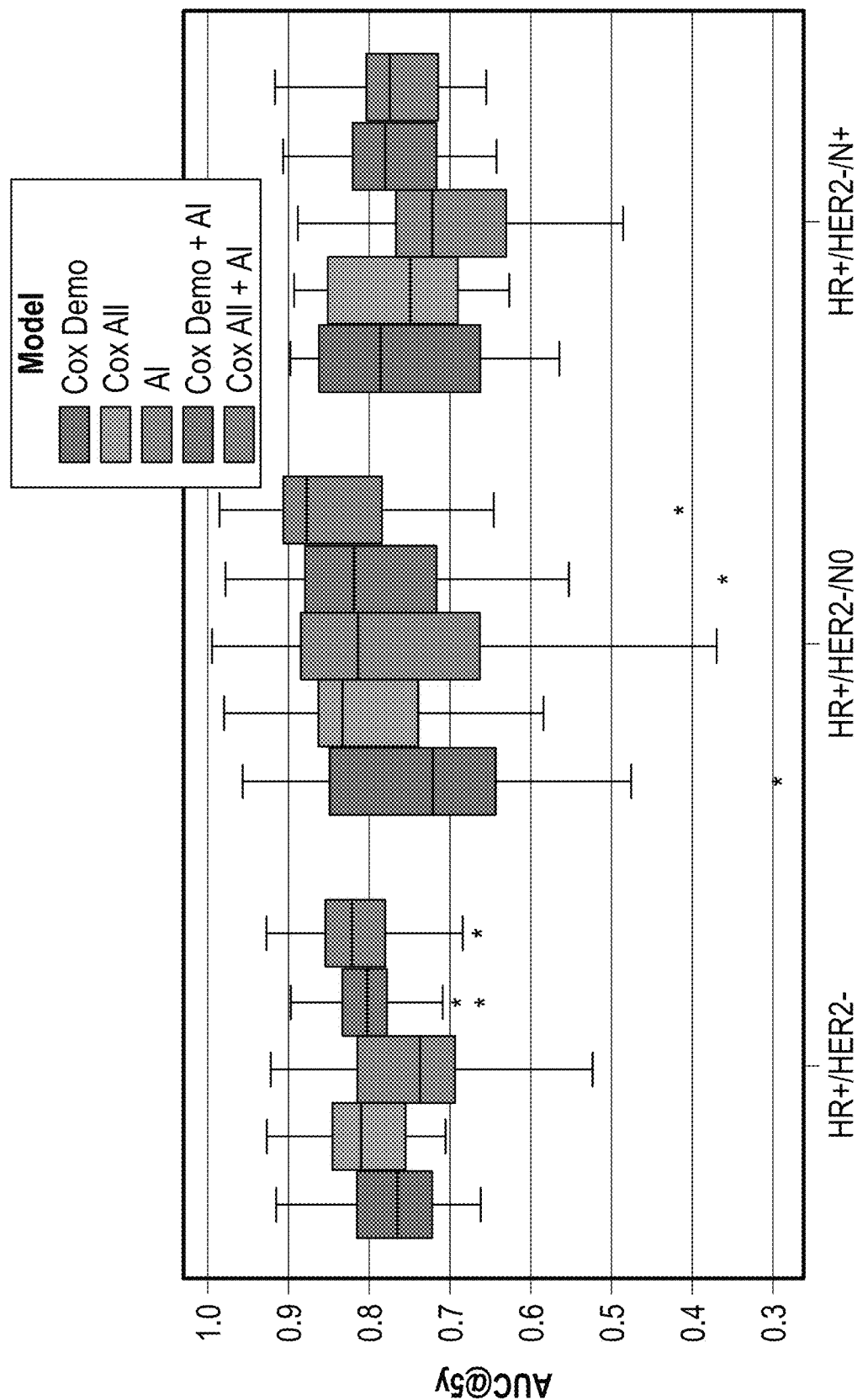

FIG. 6D depicts cross-validation results of risk of relapse in the ER+/HER2− subpopulation using DeepMIL ImageNet and/or clinical risk scores. As shown in the "all" group in FIG. 6D (left panel), in the ER+/HER2− population (n=1437), the prediction of 5-year survival (MFI) based solely on BV yielded an AUC of 0.77 ("Cox demo") and a model based on EV yielded an AUC of 0.80 ("Cox all"), as also shown in FIG. 6C (left panel). The DeepMIL ImageNet based solely on WSI yielded an AUC of 0.76 ("AI"). Combining BV with the DeepMIL ImageNet resulted in an improved AUC of 0.82 ("Cox demo+AI"). Combining EV with the DeepMIL ImageNet resulted in an improved AUC of 0.83 ("Cox all+AI").

As shown in the "n0" group in FIG. 6D (middle panel), in the subpopulation of subjects who had no lymph node metastasis at the time of diagnosis (NO; n=957), the prediction of 5-year survival (MFI) based solely on BV yielded an AUC of 0.72 ("Cox demo") and a model based on EV yielded an AUC of 0.81 ("Cox all"), also shown in FIG. 6C (middle panel). The DeepMIL ImageNet based solely on WSI yielded an AUC of 0.77 ("AI"). Combining BV with the DeepMIL ImageNet resulted in an AUC of 0.77 ("Cox demo+AI"). Combining EV with the DeepMIL ImageNet resulted in an improved AUC of 0.82 ("Cox all+AI").

As shown in the "n+" group in FIG. 6D (right panel), in the subpopulation of subjects who had lymph node metastasis at the time of diagnosis (N+; n=480), the prediction of 5-year survival (MFI) based solely on BV yielded an AUC of 0.76 ("Cox demo") and a model based on EV yielded an AUC of 0.76 ("Cox all"), also shown in FIG. 6B (right panel). The DeepMIL ImageNet based solely on WSI yielded an AUC of 0.72 ("AI"). Combining BV with the DeepMIL ImageNet resulted in an improved AUC of 0.80 ("Cox demo+AI"). Combining EV with the DeepMIL ImageNet resulted in an improved AUC of 0.79 ("Cox all+AI").

Increases in AUC when the machine learning and clinical models are combined compared to the machine learning model or the clinical model alone (e.g., a greater AUC in "Cox Demo+AI" compared to "Cox Demo" or "AI", or a greater AUC in "Cox All+AI" compared to "Cox All" or "AI") in these results demonstrate that, by using a combination of the machine learning and clinical models to determine a final risk score, the accuracy of the resulting model is increased. This is an unexpected increase in the AUC using a hybrid risk score (e.g., an average of the machine learning and clinical model risk scores) as the resulting risk score exhibits a better AUC than either the AI risk score and clinical model risk score.

Figure 7A:
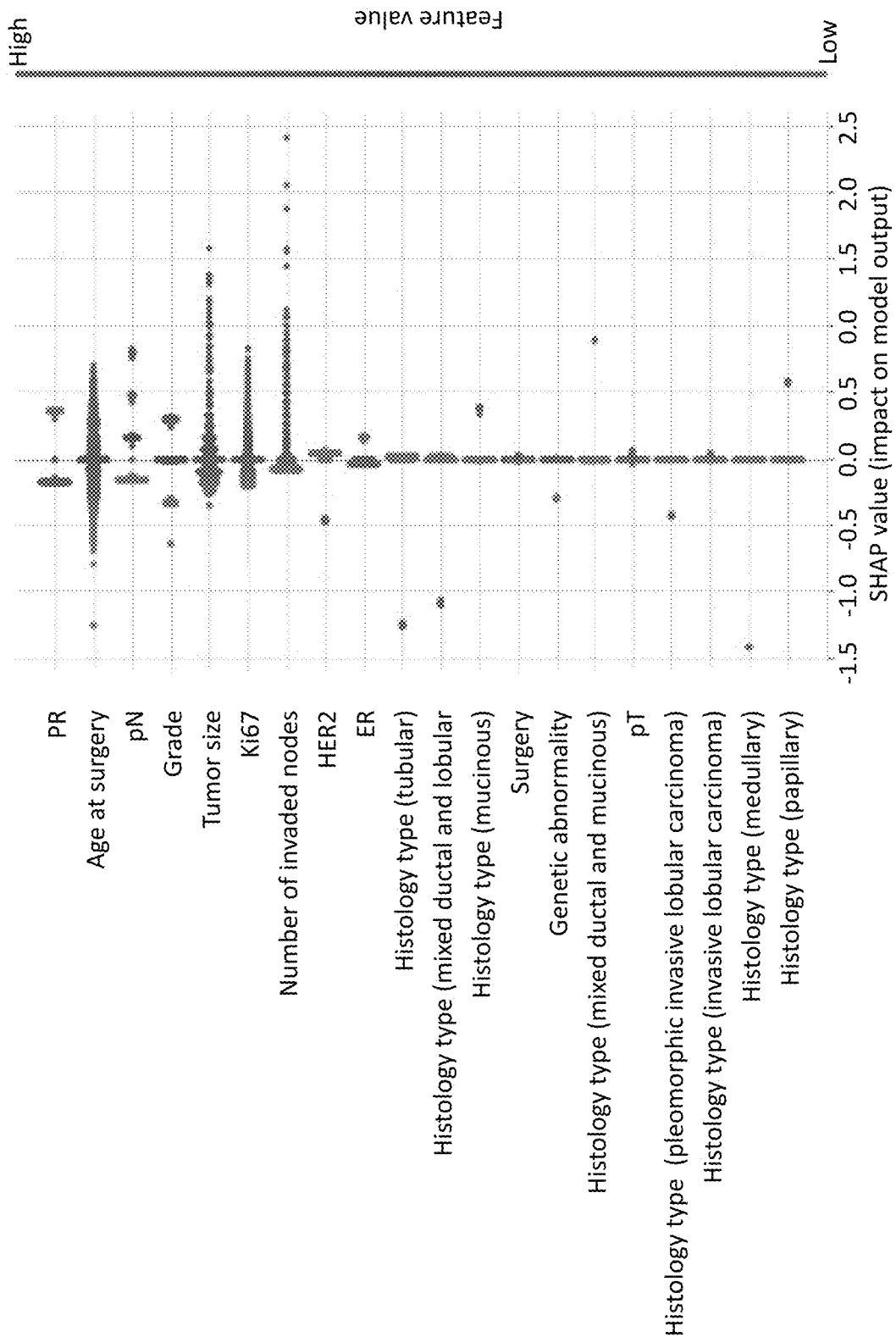
FIGS. 7A-7B show results of multivariate analysis of the effect of all clinical variables used on Cox model prediction of prognosis. Shapley values represent the impact of the clinical variables on model prediction. Clinical variables are listed in the order of the magnitude of effect on the model prediction.
Figure 7B:
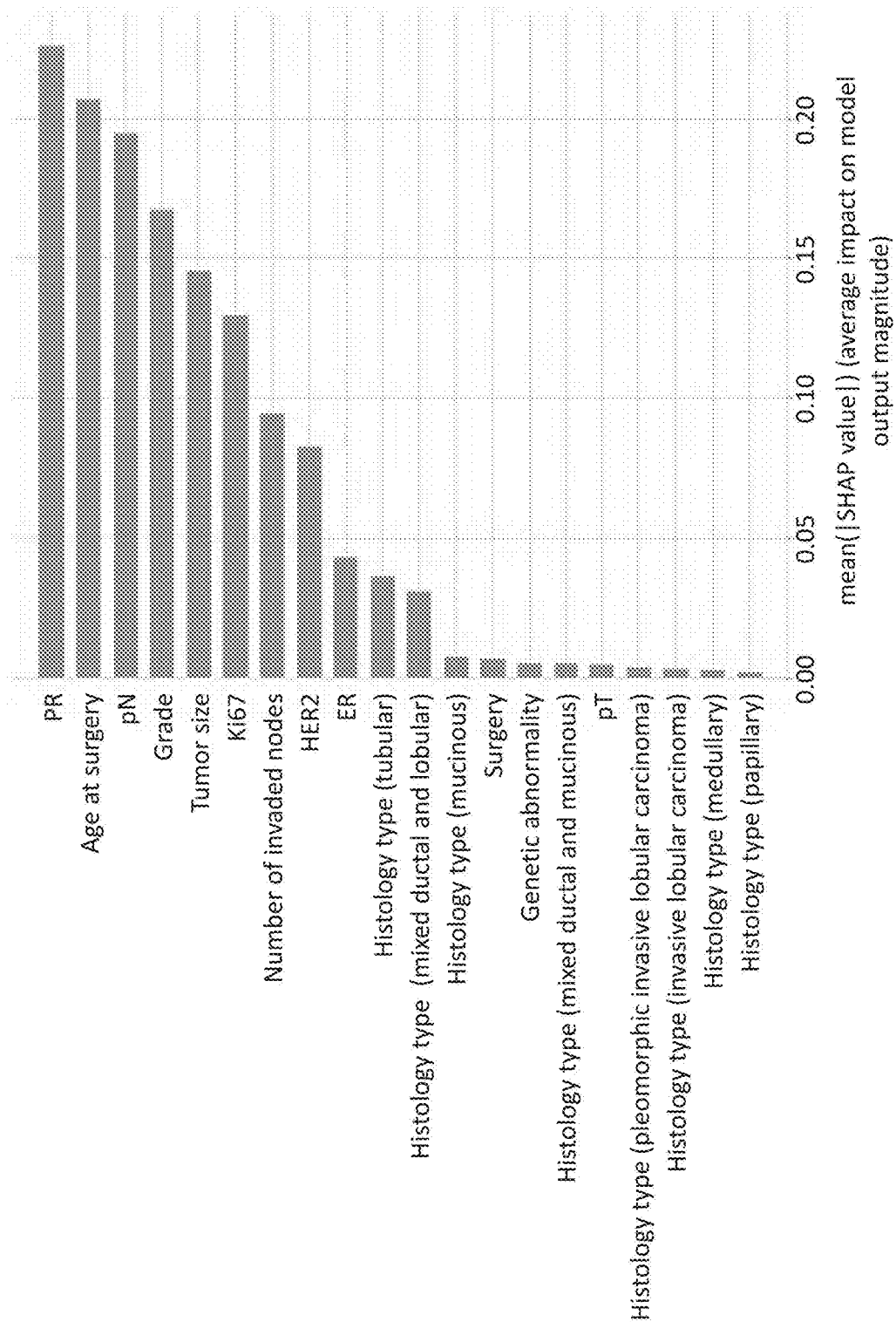
Figure 8A:
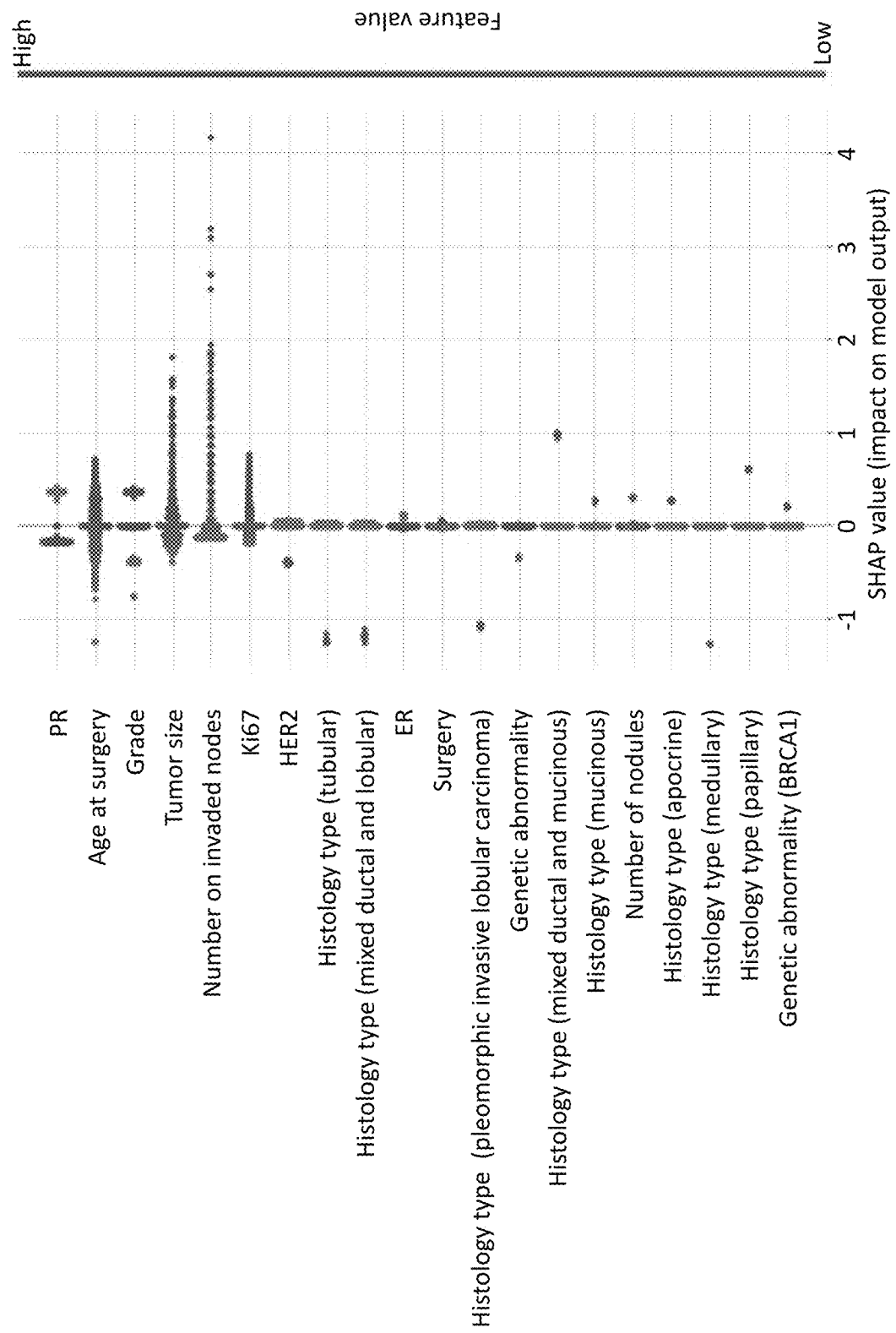
FIGS. 8A-8B show results of multivariate analysis of the effect of the clinical variables except pN and pT on Cox model prediction of prognosis. Shapley values represent the impact of the clinical variables on model prediction. Clinical variables are listed in the order of the magnitude of effect on the model prediction.
Figure 8B:
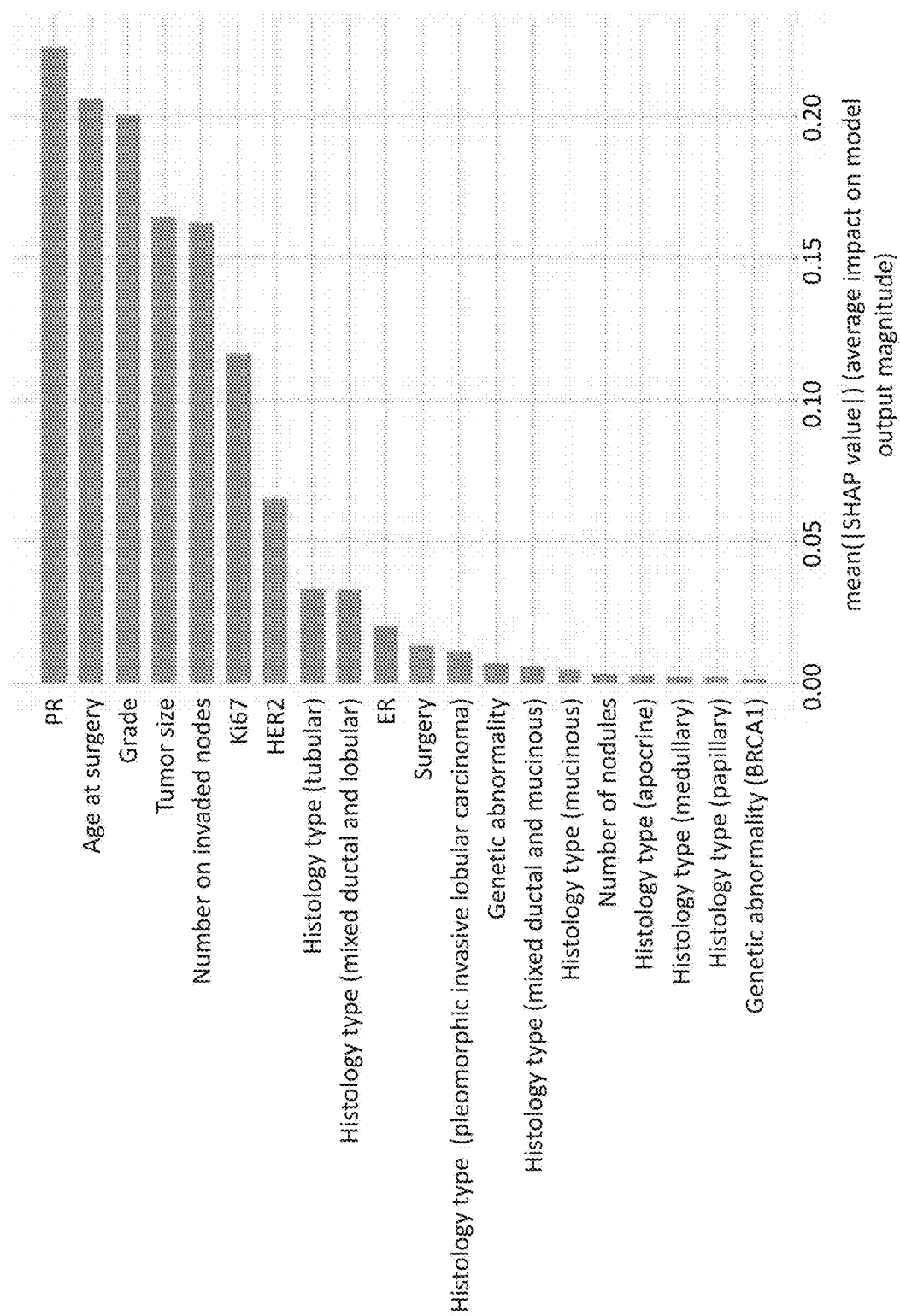

Multivariate analysis of effect of the clinical variables on Cox model prediction of prognosis was conducted (FIGS. 7-8). FIGS. 7A and 7B depict an analysis of all the clinical variables. FIGS. 8A and 8B depict an analysis of the clinical variables excluding pN and pT. Shapley values represent the impact of the clinical variables on model prediction. Clinical variables are listed in the order of the effect on the model prediction.

The results demonstrate that a machine learning model applied to WSI can predict the risk of relapse in early breast cancer subjects. The results further demonstrate that, coupled to clinical models (e.g., Cox models based on baseline clinical variables or extended clinical variables), the machine learning models can predict the risk of breast cancer relapse with an even higher accuracy compared to the machine learning models or the clinical models alone. Accordingly, a machine learning model, combined with clinical variables, is a promising tool for treatment decision-making of a disease or a condition, e.g., breast cancer, at low cost.

Further validation of the machine learning and clinical models, and combining risk scores derived therefrom, is carried out on large independent cohorts from different sources, including UNICANCER cohorts, e.g., PACS (n=3400), UNIRAD (n=4000), and CANTO (n=4000).

In some aspects, the most predictive tiles are identified and analyzed in the machine learning models, e.g., DeepMIL with MoCo features, DeepMIL with ImageNet features, or Multi-Layer Perception with MoCo features. In some aspects, the machine learning models and the most predictive tiles are used to discover new biomarkers and to develop novel models for prediction of relapse, as a cost-effective, fast, or easy alternative to techniques such as immunohistochemistry or molecular tests.

Example 2

Figure 9A:
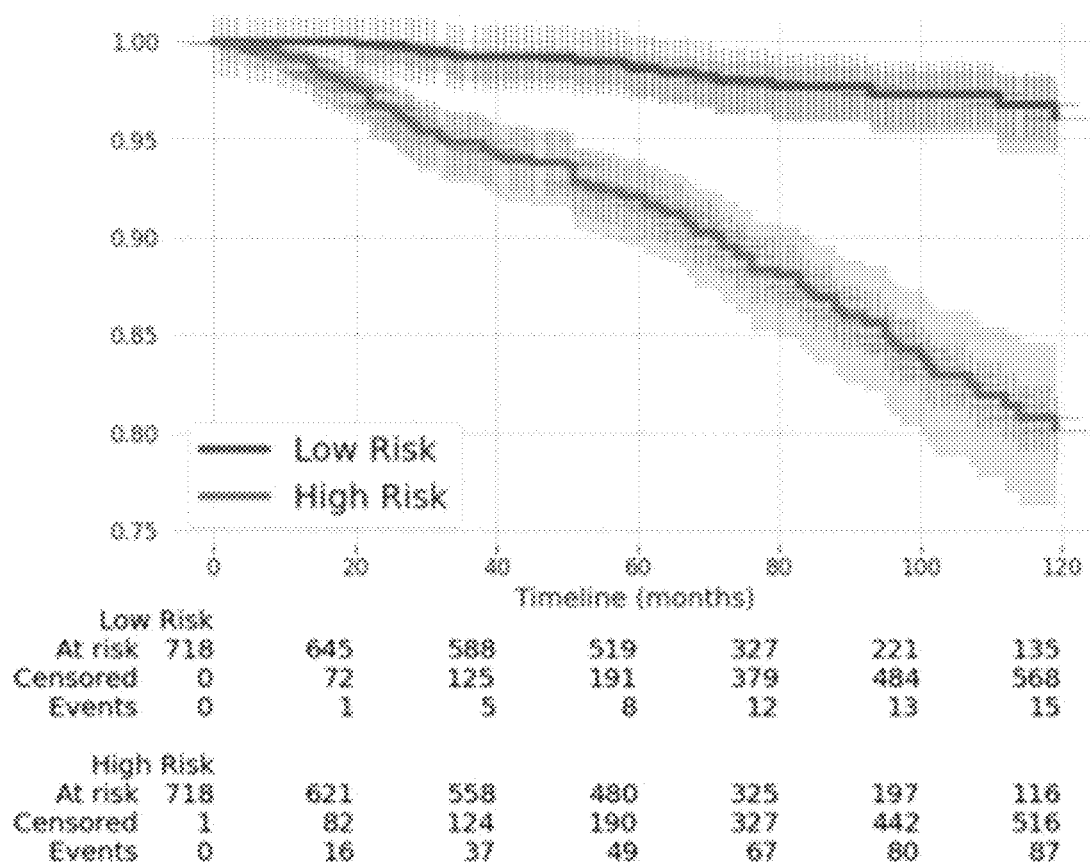

Risk Stratification of ER+/HER2− Subjects Based on Artificial Intelligence (AI) Risk Score Subjects of the cohort of Example 1 with ER+/HER2− tumor status were stratified into low risk and high risk groups using the risk score generated using the trained DeepMIL with MoCo features based on WSIs. The following clinical features were compared between the high risk and low risk groups: MFI (FIG. 9A), age (FIG. 9B), tumor grade (FIG. 9C), pN (FIG. 9D), pT (FIG. 9E), and Ki67 (FIG. 9F). The WSI-based machine learning model stratified high and low relapse risk groups with a hazard ratio (HR) of 5.25 (CI:3.20-8.61, p<0.001) (FIG. 9A). The results demonstrate the ability of the machine learning model to accurately predict risk of relapse of breast cancer based on WSIs.

Figure 10A:
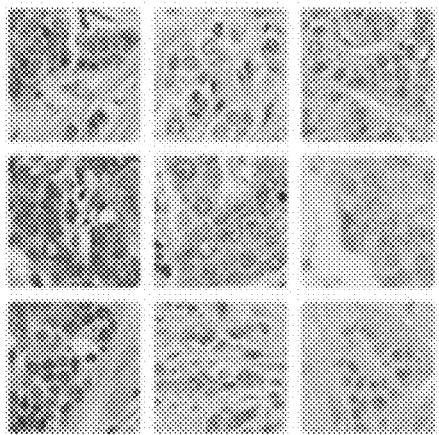
FIG. 10A shows exemplary tiles that are associated with high risk of relapse generated from whole slide images (WSIs) using DeepMIL with MoCo features according to an embodiment of the present disclosure.
Figure 10B:
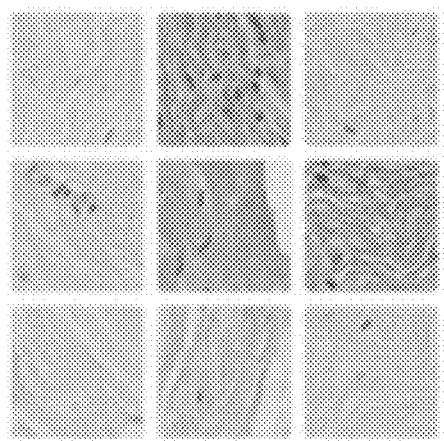
FIG. 10B shows exemplary tiles associated with low risk of relapse generated from WSIs using DeepMIL with MoCo features according to an embodiment of the present disclosure.
Figure 10C:
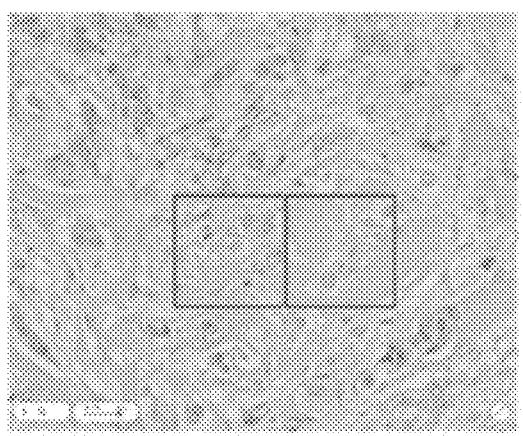
FIG. 10C shows an exemplary location of tiles predictive of high risk of relapse and surrounding regions within a WSI identified using DeepMIL with MoCo features according to an embodiment of the present disclosure.
Figure 10D:
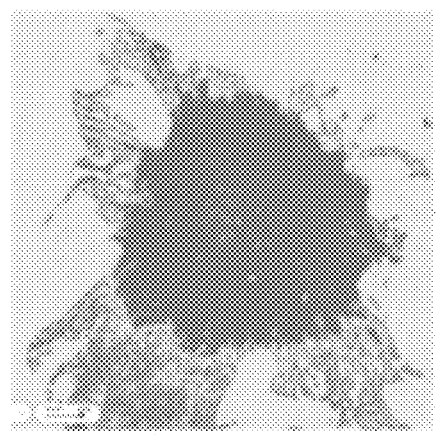
FIG. 10D shows an exemplary heat map for prediction of a tumor within a WSI generated using the trained Multi-Layer Perception with MoCo features according to an embodiment of the present disclosure.

FIGS. 10A-C and 11-13 depict exemplary tiles generated from WSIs of H&E-stained breast cancer tissues, and their association with risk of relapse, as analyzed using DeepMIL with MoCo features in an analysis platform according to the present disclosure. FIG. 10A shows exemplary tiles associated with high risk of relapse. FIG. 10B shows exemplary tiles associated with low risk of relapse. FIG. 10C shows an exemplary location of tiles predictive of high risk of relapse and surrounding regions within a WSI. FIG. 10D shows an exemplary heat map for prediction of a tumor within a WSI generated using the trained Multi-Layer Perception with MoCo features.

Figure 11A:
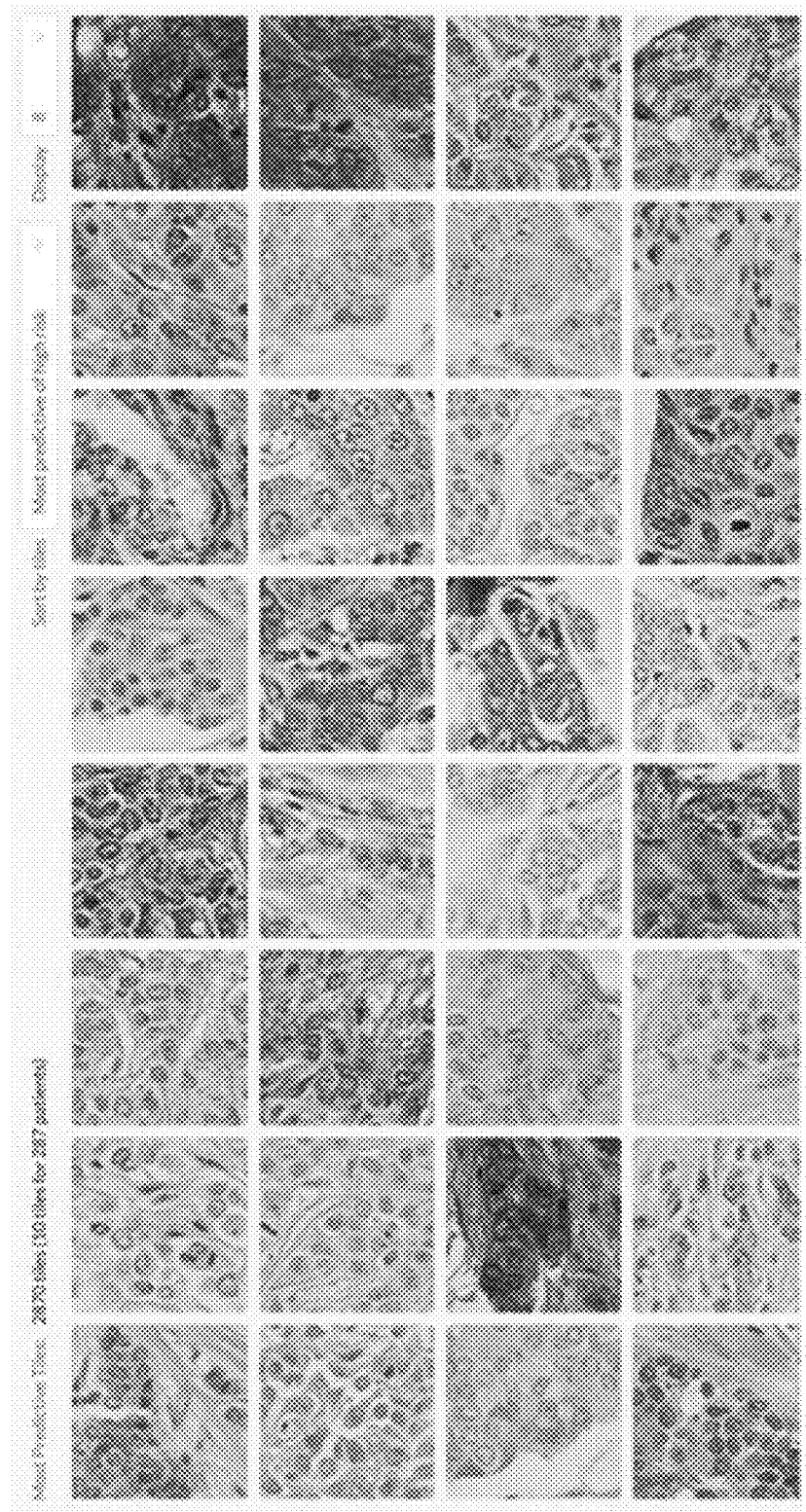
FIG. 11A shows exemplary tiles that are predictive of a high risk of relapse generated from WSIs using DeepMIL with MoCo features according to an embodiment of the present disclosure.
Figure 11B:
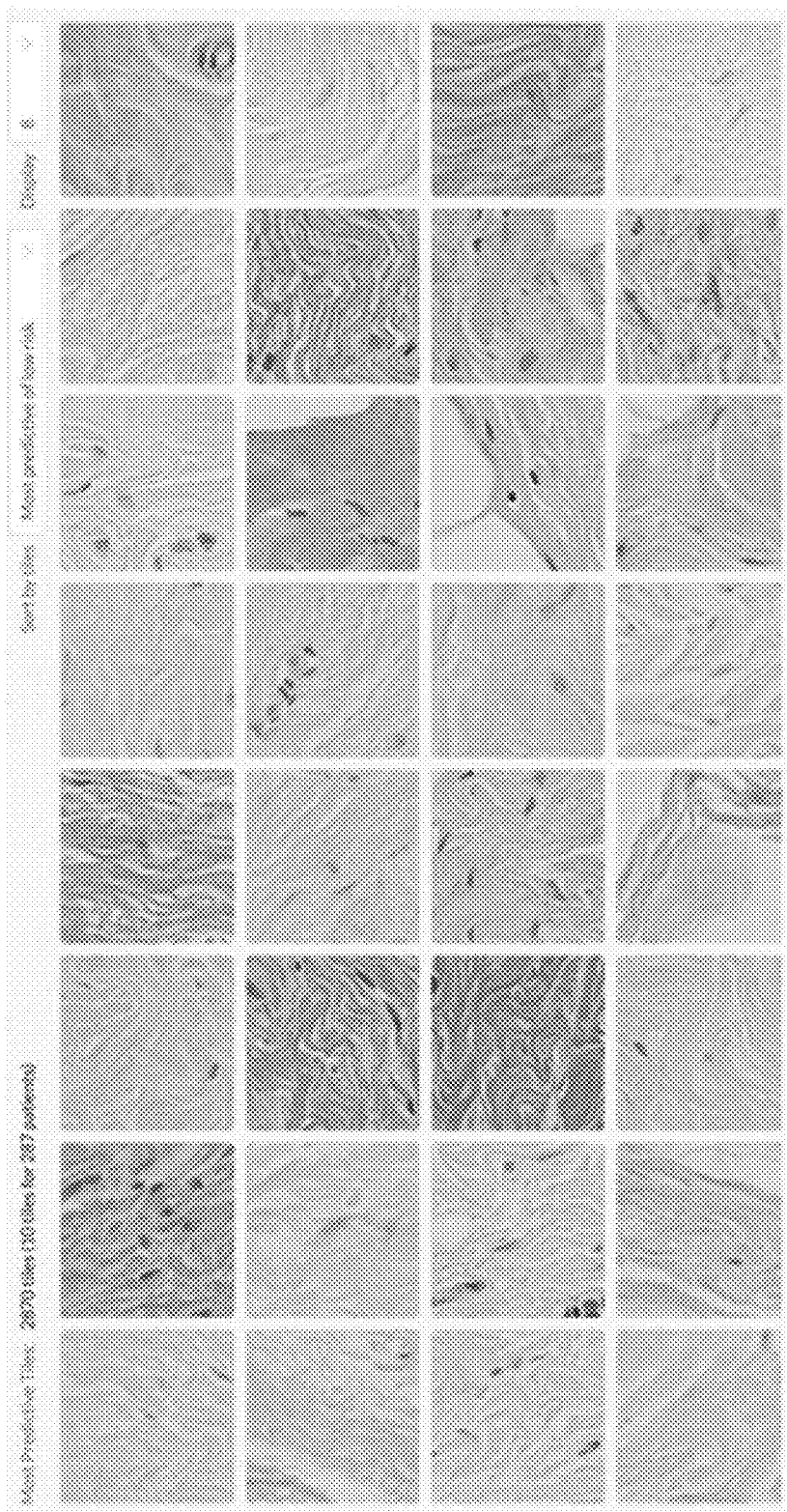
FIG. 11B shows exemplary tiles that are predictive of a low risk of relapse generated from WSIs using DeepMIL with MoCo features according to an embodiment of the present disclosure.
Figure 11C:
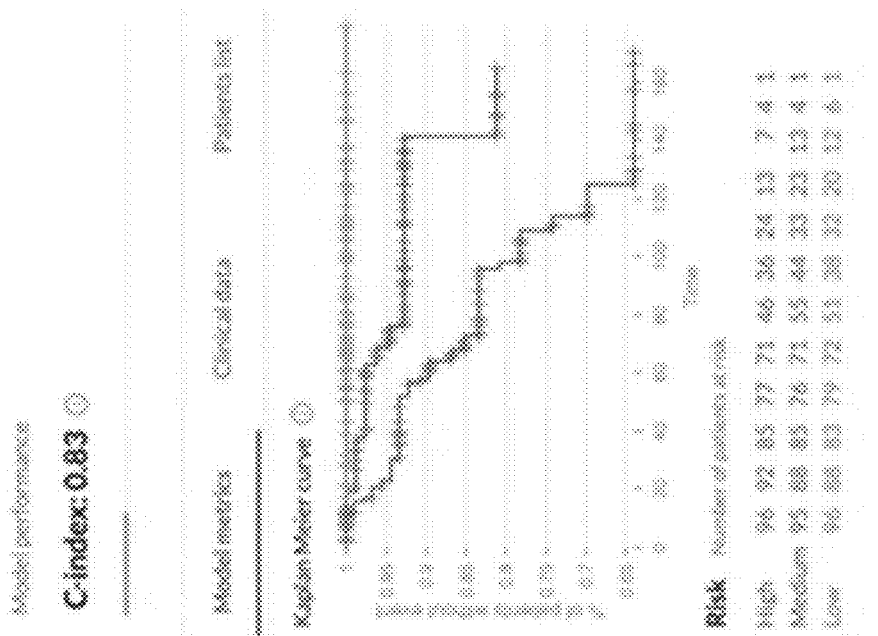
FIG. 11C shows survival curves of subjects stratified into high risk, medium risk, and low risk groups based on the AI risk score according to the present disclosure.

FIG. 11A shows exemplary tiles predictive of a high risk of relapse. FIG. 11B shows exemplary tiles predictive of a low risk of relapse. FIG. 11C shows survival curves and hazard ratio assessment of subjects stratified into high risk, medium risk, and low risk groups based on the AI risk score.

Figure 12:
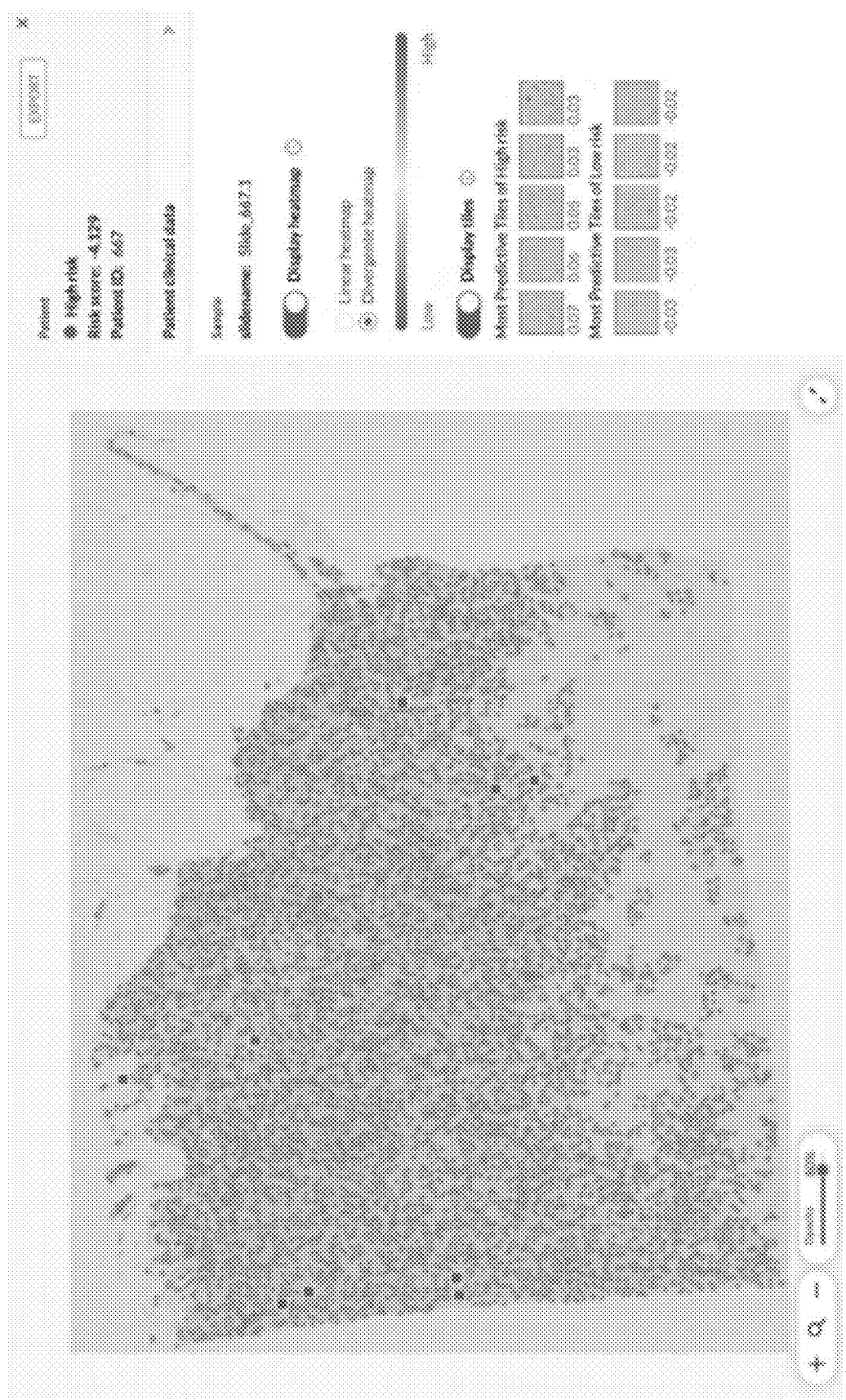
FIG. 12 is an exemplary heat map showing regions within a WSI having characteristics associated with high and low risk of relapse, according to an embodiment of the present disclosure.
Figure 13:
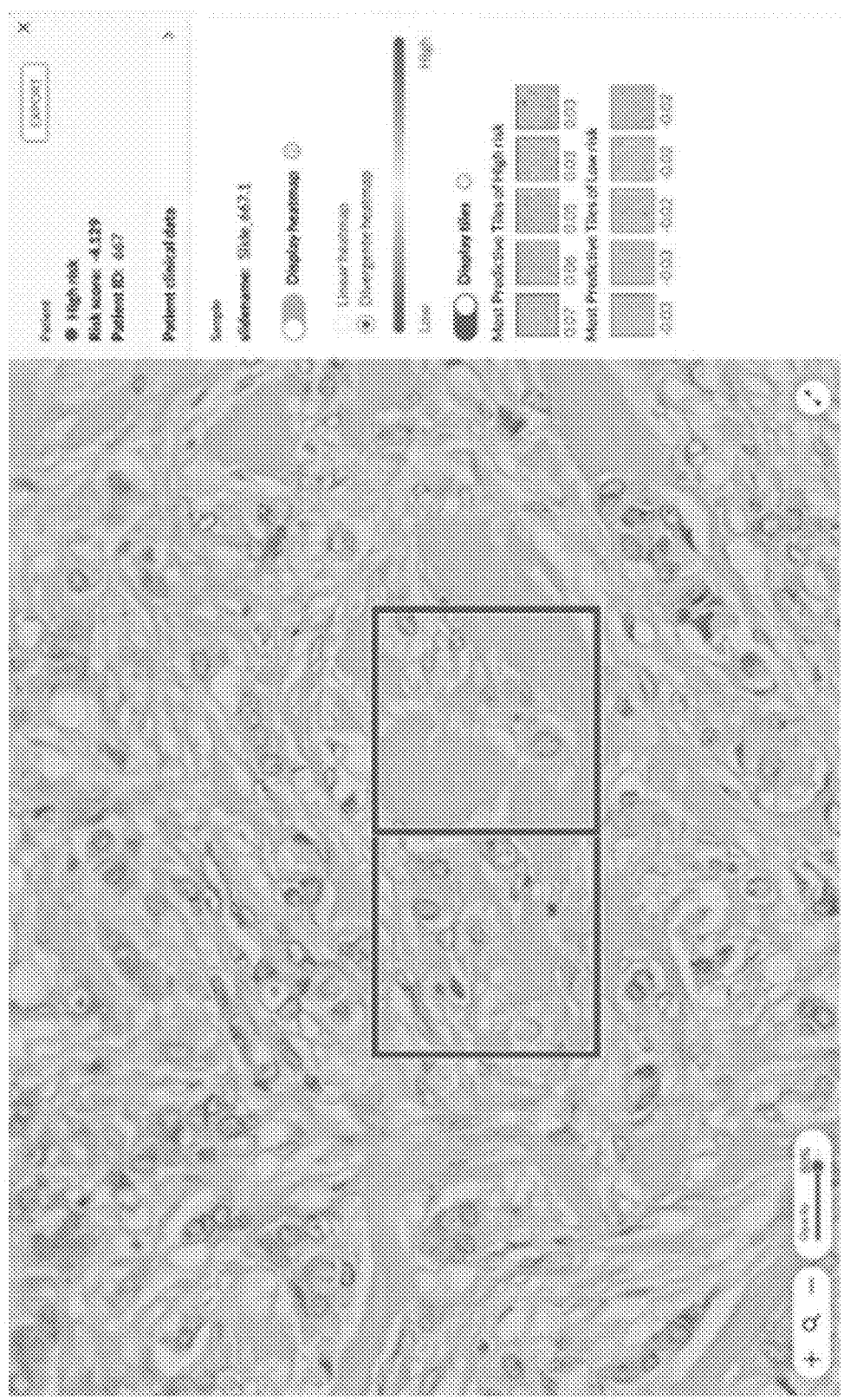
FIG. 13 shows exemplary tiles predictive of high risk of relapse and surrounding regions within a WSI, according to an embodiment of the present disclosure.

FIG. 12 is an exemplary heat map showing regions within a WSI having characteristics associated with high and low risk of relapse. The red dots correspond to exemplary regions predictive of a high risk of relapse. The blue dots correspond to exemplary regions predictive of a low risk of relapse. FIG. 13 shows exemplary tiles predictive of high risk of relapse and surrounding regions within a WSI.

Regions identified by the machine learning model as predictive of high or low risk of relapse are further histologically analyzed to improve the ability of the model to predict relapse regions based on histology and/or WSIs.

Example 3

Figure 14:
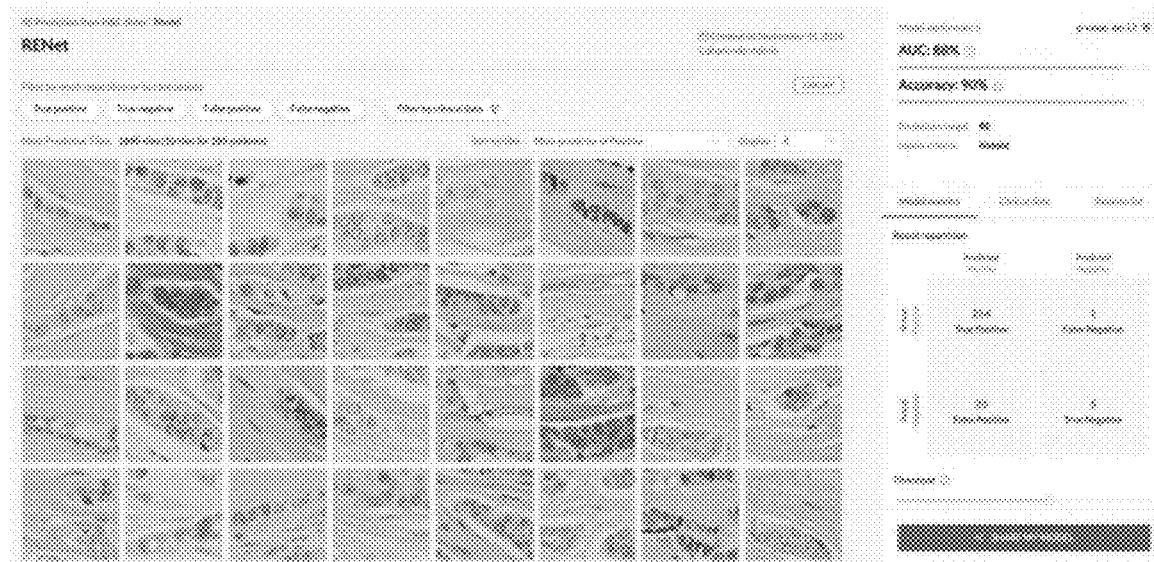
FIG. 14 shows exemplary tiles predictive of an ER+ status of the tumor by DeepMIL with ImageNet features and evaluation of accuracy of the prediction, according to an embodiment of the present disclosure.
Figure 15:
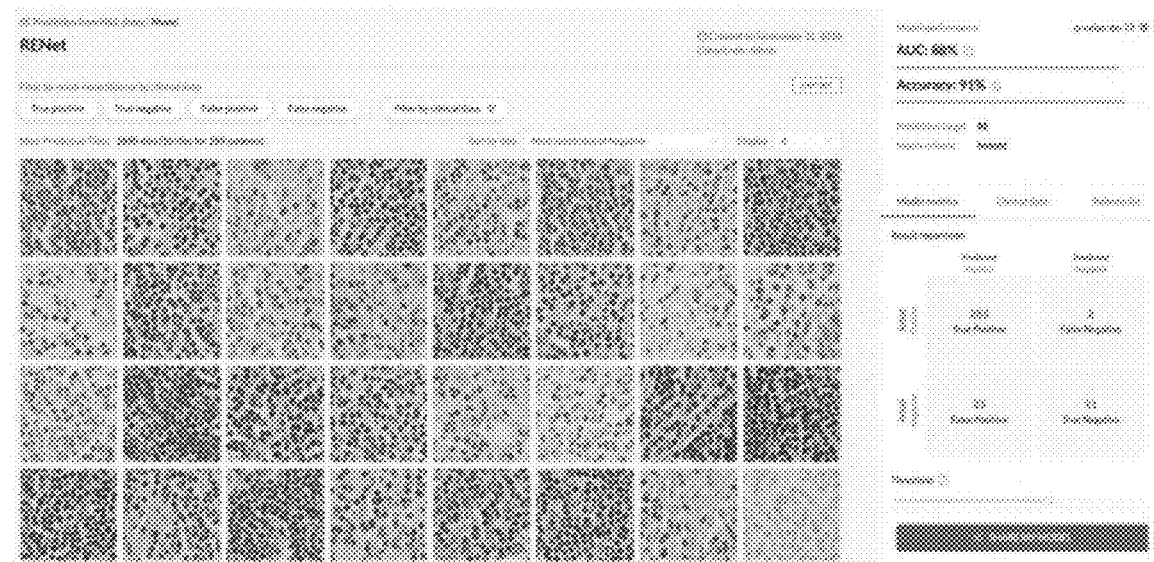
FIG. 15 shows exemplary tiles predictive of an ER– status of the tumor by DeepMIL with ImageNet features and evaluation of accuracy of the prediction according to an embodiment of the present disclosure.

Prediction of Molecular Biomarkers of Breast Cancer Using H&E Whole Slide Images The ability of the machine learning model to predict the status of molecular biomarkers ER, PR, Ki67, and HER2 in tumor tissue was analyzed in the subjects of the study cohort of Example 1. The H&E stained glass slides with the breast tissues of the subjects were digitized, preprocessed, and cut into small patches (tiles), and the tiles were fed into a deep learning ("DL") network (DeepMIL ImageNet) along with the biomarker information as described in Example 1. A weighted average of tile features was computed to predict positivity or negativity of each biomarker. FIG. 14 shows exemplary tiles predicted to be ER-positive by DeepMIL ImageNet. The machine learning model predicted the ER+status with an AUC of 88% and an accuracy of 90% FIG. 15 shows exemplary tiles predicted to be ER-negative by DeepMIL ImageNet. The machine learning model predicted the ER+status with an AUC of 88% and an accuracy of 91%

Figure 16:
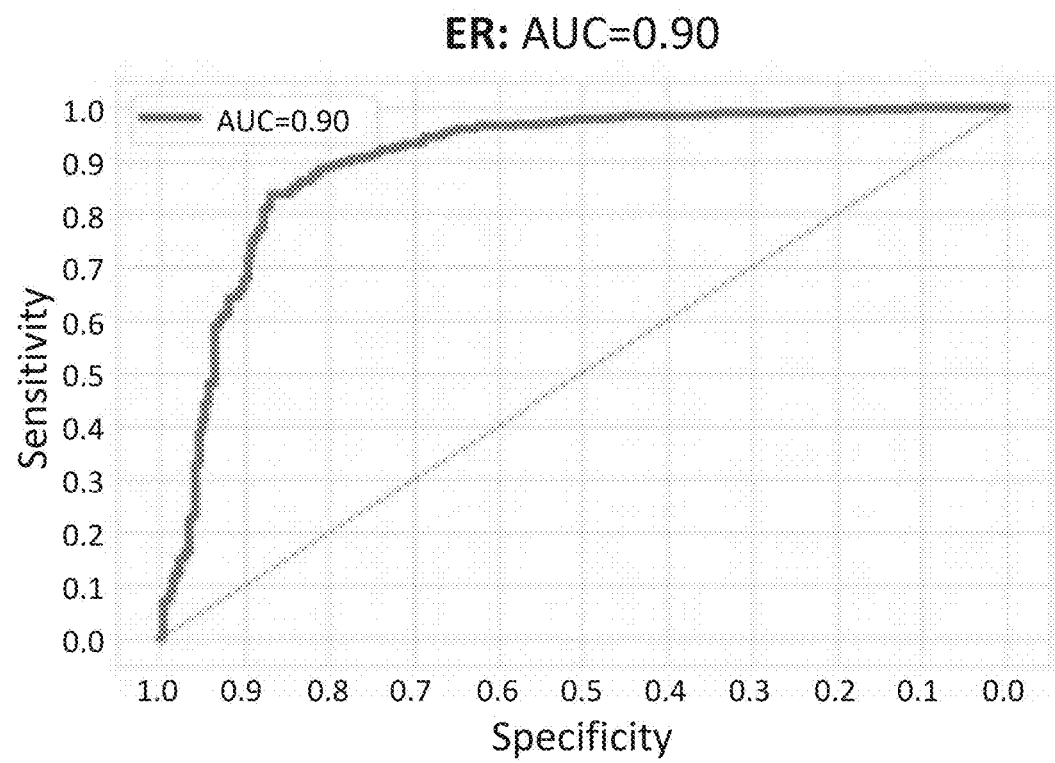
FIG. 16 shows a graph of the sensitivity and specificity of prediction by DeepMIL with ImageNet features of an ER status of a tumor in the analyzed tumor tissue, according to an embodiment of the present disclosure.

As shown in FIG. 16, DeepMIL ImageNet predicted the status of ER in tumor tissue of subjects with an AUC of 0.90. For example, by adjusting the threshold values for the parameters, the model predicted the ER status with sensitivity of 99% and specificity of 36% (i.e., 99% of ER+ tumor can be identified; 36% of ER– tumor can be ruled out); with sensitivity 98% and specificity 52%; or with sensitivity 95% and specificity 68%.

Figure 17:
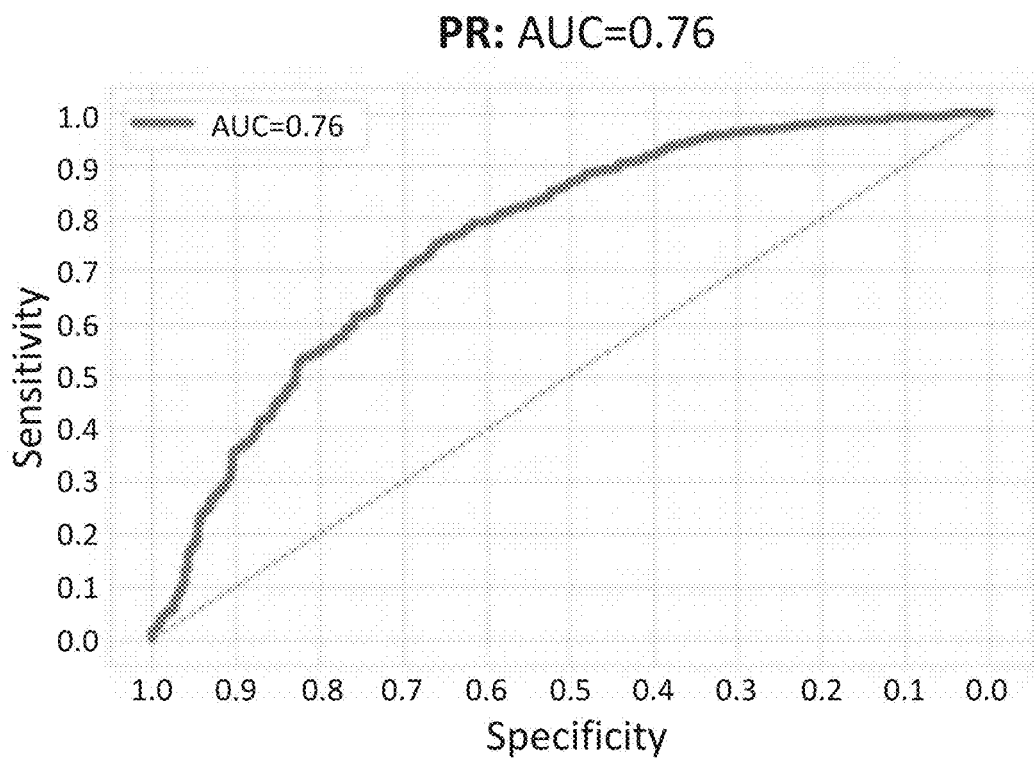
FIG. 17 shows a graph of the sensitivity and specificity of prediction by DeepMIL with ImageNet features of a PR status of a tumor in the analyzed tumor tissue, according to an embodiment of the present disclosure.

As shown in FIG. 17, DeepMIL ImageNet predicted the status of PR in tumor tissue of subjects with an AUC of 0.76. For example, by adjusting the threshold values for the parameters, the model predicted the PR status with sensitivity of 99% and specificity of 20% (i.e., 99% of PR+ tumor can be identified; 20% of PR– tumor can be ruled out); with sensitivity 98% and specificity 24%; or with sensitivity 95% and specificity 35%.

Figure 18:
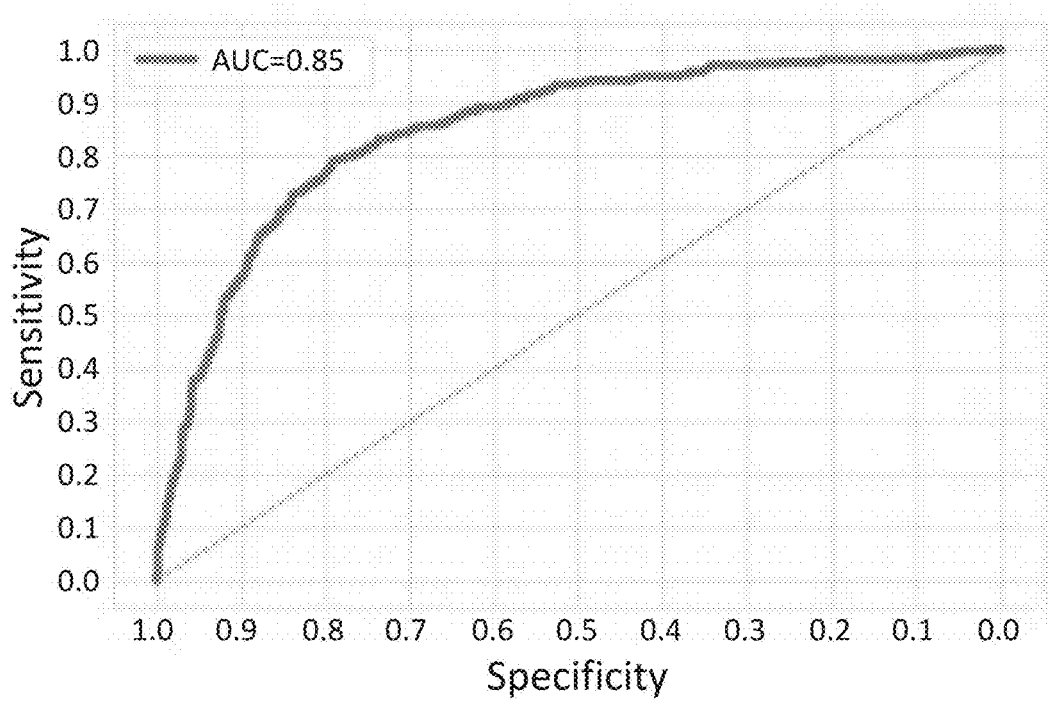
FIG. 18 shows a graph of the sensitivity and specificity of prediction by DeepMIL with ImageNet features of a Ki67 status of a tumor in the analyzed tumor tissue, according to an embodiment of the present disclosure.

As shown in FIG. 18, DeepMIL ImageNet predicted the status of Ki67 in tumor tissue of subjects with an AUC of 0.85. For example, by adjusting the threshold values for the parameters, the model predicted the Ki67 status with sensitivity of 99% and specificity of 9% (i.e., 99% of Ki67+ tumor can be identified; 9% of Ki67– tumor can be ruled out); with sensitivity 98% and specificity 26%; or with sensitivity 95% and specificity 43%.

Figure 19:
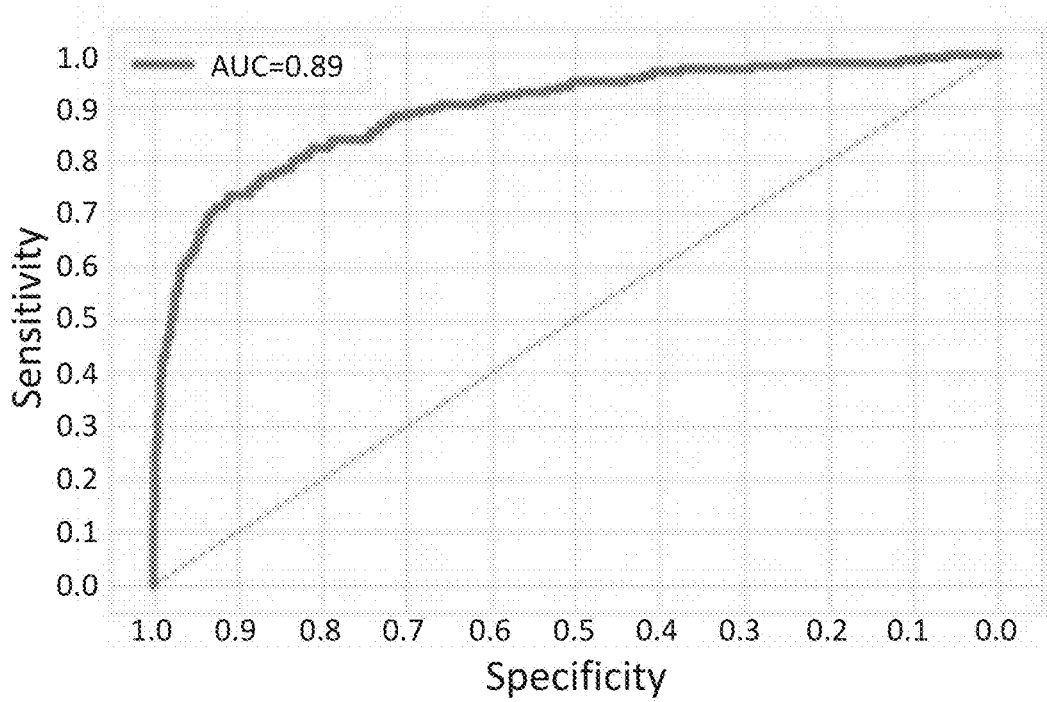
FIG. 19 shows a graph of the sensitivity and specificity of prediction by DeepMIL with ImageNet features of a HER2 status of a tumor in the analyzed tumor tissue, according to an embodiment of the present disclosure.

As shown in FIG. 19, DeepMIL ImageNet predicted the status of HER2 in tumor tissue of subjects with an AUC of 0.89. For example, by adjusting the threshold values for the parameters, the model predicted the HER2 status with sensitivity of 99% and specificity of 11% (i.e., 99% of HER2+ tumor can be identified; 11% of HER2– tumor can be ruled out); with sensitivity 98% and specificity 29%; or with sensitivity 95% and specificity 50%.

The machine learning models of the present disclosure are further evaluated for its ability to predict status of other breast cancer biomarkers based on the histological and morphological information available in histology slides, e.g., WSIs. Based on the results of biomarker prediction by machine learning models, novel biomarkers for diagnosis and prognosis of breast cancer are identified.

Example 4

Computer System and Machine Readable Medium

As shown in FIG. 20, the exemplary computer system 2000, which is a form of a data processing system, includes a bus 2003 which is coupled to a microprocessor(s) 2005 and a ROM (Read Only Memory) 2007 and volatile RAM 2009 and a non-volatile memory 2013. The microprocessor 2005 may include one or more CPU(s), GPU(s), a specialized processor, and/or a combination thereof. The microprocessor 905 may be in communication with a cache 2004, and may retrieve the instructions from the memories 2007, 2009, 2013 and execute the instructions to perform operations described above. The bus 2003 interconnects these various components together and also interconnects these components 2005, 2007, 2009, and 2013 to a display controller and display device 2015 and to peripheral devices such as input/output (I/O) devices 2011 which may be mice, keyboards, modems, network interfaces, printers and other devices which are well known in the art. Typically, the input/output devices 2011 are coupled to the system through input/output controllers 2017. The volatile RAM (Random Access Memory) 2009 is typically implemented as dynamic RAM (DRAM), which requires power continually in order to refresh or maintain the data in the memory.

The nonvolatile memory 2013 can be, for example, a magnetic hard drive or a magnetic optical drive or an optical drive or a DVD RAM or a flash memory or other types of memory systems, which maintain data (e.g. large amounts of data) even after power is removed from the system. Typically, the nonvolatile memory 2013 will also be a random access memory although this is not required. While FIG. 20 shows that the nonvolatile memory 2013 is a local device coupled directly to the rest of the components in the data processing system, it will be appreciated that the present invention may utilize a nonvolatile memory which is remote from the system, such as a network storage device which is coupled to the data processing system through a network interface such as a modem, an Ethernet interface or a wireless network. The bus 2003 may include one or more buses connected to each other through various bridges, controllers and/or adapters as is well known in the art.

The foregoing discussion merely describes some exemplary embodiments of the present invention. One skilled in the art will readily recognize from such discussion, the accompanying drawings and the claims that various modifications can be made without departing from the spirit and scope of the invention. Furthermore, where feasible, any of the aspects disclosed herein may be combined with each other (e.g., the feature according to one aspect may be added to the features of another aspect or replace an equivalent feature of another aspect) or with features that are well known in the art, unless indicated otherwise by context.

All citations to references, including, for example, citations to patents, published patent applications, and articles, are herein incorporated by reference in their entirety.

The section headings used herein are for organizational purposes only and are not to be construed as limiting the subject matter described in any way.

What is claimed is:

1. A computer-implemented method of predicting the likelihood that a subject having breast cancer will experience a relapse following treatment for identifying a targeted therapy option for breast cancer in the subject, said method comprising:

obtaining a digital image of a histologic section of a breast cancer sample derived from the subject;

obtaining one or more subject attributes derived from the subject;

computing an artificial intelligence (AI) risk score using a machine learning model, the machine learning model having been trained by processing a plurality of training images to predict a risk of relapse and the AI risk score being a first risk score for breast cancer;

computing a clinical risk score using a clinical model and the one or more subject attributes, the clinical model having been trained using one or more subject training attributes from different subjects and the clinical risk score being a second risk score for breast cancer;

stratifying a high risk group and a low risk group across the different subjects for respective clinical risk scores as output by the clinical model, wherein the high risk group has a higher likelihood for relapse of breast cancer than the low risk group;

computing a final risk score for the subject from the AI risk score and the clinical risk score by taking a weighted average between the AI risk score and the clinical risk score;

detecting that the AI risk score of the subject is within a range of the high risk group;

providing a diagnosis or prognosis based on the high risk of relapse for the subject comprising a personalized medicine or targeted therapy to treat the subject; and administering a treatment to the subject to treat breast cancer based on the diagnosis or prognosis, wherein the treatment comprises administering a hormone therapy drug or a HER2 protein targeting drug.

2. The computer-implemented method of claim 1, wherein the digital image is a whole slide image.

3. The computer-implemented method of claim 1, wherein the histologic section of the breast cancer sample has been stained with a dye.

4. The computer-implemented method of claim 3, wherein the dye is Haemotoxylin and Eosin (H&E).

5. The computer-implemented method of claim 1, wherein the breast cancer sample is derived from the subject prior to treatment for said breast cancer.

6. The computer-implemented method of claim 1, wherein the machine learning algorithm is a self-supervised learning algorithm.

7. The computer-implemented method of claim 6, wherein the self-supervised learning algorithm is Momentum Contrast (MoCo) or Momentum Contrast v2.

8. The computer-implemented method of claim 6, wherein the machine learning model includes a Multi-Layer Perceptron model.

9. The computer-implemented method of claim 1, wherein the method further comprises: extracting a plurality of feature vectors from the digital image.

10. The computer-implemented method of claim 9, wherein the extracting of the plurality of features is performed using a first convolutional neural network.

11. The computer-implemented method of claim 10, wherein the first convolutional neural network is a ResNet50 neural network.

12. The computer-implemented method of any one of claim 1, wherein the method further comprises: removing background segments from the image.

13. The computer-implemented method of claim 12, wherein removing background segments from the image is performed using a second convolutional neural network.

14. The computer-implemented method of claim 13, wherein the second convolutional neural network is a semantic segmentation deep learning network.

15. The computer-implemented method of claim 1, wherein the weights in the weighted average are the same.

16. The computer-implemented method of claim 1, wherein the machine learning model is trained using a plurality of training images, wherein the plurality of training images comprise digital images of histologic sections of breast cancer samples derived from a plurality of control subjects.

17. The computer-implemented method of claim 16, wherein the plurality of training images comprise images that lack local annotations.

18. The computer-implemented method of claim 16, wherein the plurality of training images comprise images associated with one or more global label(s) indicative of one or more disease feature(s) of the control subject from whom the sample is derived.

19. The computer-implemented method of claim 18, wherein the disease feature is duration of time to breast cancer relapse.

20. The computer-implemented method of claim 18, wherein the one or more disease feature(s) include one or more of subject age at the time of surgery, menopausal status, tumor stage, tumor size, number of positive nodes (N+), number of nodules, surgery type, and/or treatment type, or a combination thereof.

21. The computer-implemented method of any one of claim 18, wherein the disease feature(s) include one or more of estrogen receptor (ER) status, progesterone receptor (PR) status, HER2 status, tumor grade, Ki67 expression, histological type, and/or presence or absence of one or more mutations in the BRCA gene or the TP53 gene, or a combination thereof.

22. The computer-implemented method of claim 18, wherein the method comprises obtaining one or more disease features of the subject, and applying a machine learning model to both the extracted features and the disease features of the subject, wherein one or more of the disease feature(s) of the subject are the same as one or more of the disease feature(s) represented in the global label(s) associated with the training images.

23. The computer-implemented method of claim 1, wherein the final risk score represents the likelihood that the subject will experience a relapse within 5 years of the date that the breast cancer sample was derived from the subject.

24. The computer-implemented method of claim 1, wherein the machine learning model is a Deep Multiple Instance Learning (DeepMIL) model.

25. The computer-implemented method of claim 1, wherein the machine learning model is a Weldon model.

26. A non-transitory machine readable medium having executable instructions to cause one or more processing units to perform a method of predicting the likelihood that a subject having breast cancer will experience a relapse following treatment for identifying a targeted therapy option for breast cancer in the subject, said method comprising:

obtaining a digital image of a histologic section of a breast cancer sample derived from the subject;

obtaining one or more subject attributes derived from the subject;

computing an artificial intelligence (AI) risk score using a machine learning model, the machine learning model having been trained by processing a plurality of training images to predict a risk of relapse and the AI risk score being a first risk score for breast cancer;

computing a clinical risk score using a clinical model and the one or more subject attributes, the clinical model having been trained using one or more subject training attributes from different subjects and the clinical risk score being a second risk score for breast cancer;

stratifying a high risk group and a low risk group across the different subjects for respective clinical risk scores as output by the clinical model, wherein the high risk group has a higher likelihood for relapse of breast cancer than the low risk group;

computing a final risk score for the subject from the AI risk score and the clinical risk score by taking a weighted average between the AI risk score and the clinical risk score;

detecting that the AI risk score of the subject is within a range of the high risk group;

providing a diagnosis or prognosis based on the high risk of relapse for the subject comprising a personalized medicine or targeted therapy to treat the subject; and administering a treatment to the subject to treat breast cancer based on the diagnosis or prognosis, wherein the treatment comprises administering a hormone therapy drug or a HER2 protein targeting drug.

27. The non-transitory machine readable medium of claim 26, wherein the machine learning algorithm is a self-supervised learning algorithm.

28. The non-transitory machine readable medium of claim 26, wherein the method further comprises: extracting a plurality of feature vectors from the digital image.

29. The machine readable medium of any one of claim 26, wherein the method further comprises: removing background segments from the image.

\* \* \* \* \*